US012732934B2

(12) United States Patent
Singhal et al.

(10) Patent No.: US 12,732,934 B2
(45) Date of Patent: Sep. 8, 2026

(54) CLOCK QUALITY MEASUREMENTS AND MONITORING IN 5G NETWORK

(71) Applicant: Cisco Technology Inc., San Jose, CA (US)

(72) Inventors: Manik Singhal, Bengaluru (IN); Parthibhan Paramaguru, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 18/389,967

(22) Filed: Dec. 20, 2023

(65) Prior Publication Data

US 2025/0212145 A1 Jun. 26, 2025

(51) Int. Cl.
*H04W 56/00* (2009.01)

(52) U.S. Cl.
CPC ............................... *H04W 56/0035* (2013.01)

(58) Field of Classification Search
CPC ................................................. H04W 56/0035
See application file for complete search history.

(56) References Cited

U.S. PATENT DOCUMENTS 6,218,800 B1 * 4/2001 Akkermans ............ G05B 19/21 318/632
7,573,303 B1 * 8/2009 Chi .......................... H03L 7/23 327/156
9,484,962 B1 11/2016 Magesacher et al.
9,998,247 B1 6/2018 Choudhury et al.
10,253,717 B1 * 4/2019 Esposito ................. F02D 41/26
10,404,447 B1 9/2019 Haddad et al.
10,795,783 B2 * 10/2020 Wojewoda .......... G06F 11/1604
(Continued)

FOREIGN PATENT DOCUMENTS

WO 2013023505 A1 2/2013

OTHER PUBLICATIONS

Cisco: "PTP and SyncE Basics with Cisco IOS XR Configuration", last updated on Nov. 30, 2021, 52 Pages.
(Continued)

*Primary Examiner* — Khaled M Kassim
*Assistant Examiner* — Christopher A. Reyes
(74) *Attorney, Agent, or Firm* — Baker Botts L.L.P.

(57) ABSTRACT

An apparatus configured to perform clock quality measurements and monitoring operations in one or more communication networks may comprise a memory and a processor communicatively coupled to one another. The processor may be configured to receive a first clock and a second clock from a network device, obtain multiple thresholds associated with the network device, obtain multiple error detection configuration commands, select a threshold of the multiple thresholds, select an error detection configuration command, and evaluate the first clock based at least in part upon the threshold and the error detection configuration command. Further, the processor may be configured to generate a result indicating whether the first clock comprises a clock error greater than the threshold and record the threshold and the error detection configuration command against an input reference of the clock in response to generating the result indicating that the clock comprises the clock error greater than the threshold.

20 Claims, 10 Drawing Sheets

(56) References Cited

U.S. PATENT DOCUMENTS 11,398,812 B1 * 7/2022 Bowman ................ H03K 3/017
11,424,736 B1 * 8/2022 Bowman ................ H03K 19/20
11,539,451 B2 12/2022 Herber et al.
11,539,452 B2 12/2022 Abdullah et al.
11,706,014 B1 7/2023 Manevich et al.
11,855,645 B2 * 12/2023 Bowman ............... H03L 7/0814
11,982,547 B2 * 5/2024 Close ................. G01D 5/24438
12,040,886 B2 * 7/2024 Rabinovich ........... H04J 3/0658
12,132,567 B2 10/2024 Lv et al.
12,261,759 B1 3/2025 Vaez-Ghaemi et al.
2011/0200051 A1 * 8/2011 Rivaud ................. H04L 12/413 370/503
2011/0255546 A1 10/2011 Le Pallec et al.
2012/0139882 A1 * 6/2012 Kim ....................... G09G 5/008 345/204
2013/0039220 A1 2/2013 Ruffini et al.
2013/0039359 A1 * 2/2013 Bedrosian ............. H04J 3/0667 370/350
2014/0281037 A1 9/2014 Spada et al.
2014/0306635 A1 * 10/2014 Watahiki ................ G03G 15/55 399/36
2015/0033101 A1 * 1/2015 Chebruch ................. G06F 1/04 714/798
2015/0071030 A1 * 3/2015 Hayashi .............. G01S 7/52023 367/7
2015/0092793 A1 4/2015 Aweya
2015/0092797 A1 * 4/2015 Aweya .................. H04J 3/0667 370/516
2015/0188691 A1 * 7/2015 Mizuguchi ............ H04L 7/0012 375/355
2015/0220067 A1 * 8/2015 Tsuneki ................ G05B 11/011 318/632
2015/0295702 A1 10/2015 Ogawa
2017/0214516 A1 7/2017 Rivaud et al.
2017/0288801 A1 10/2017 Aweya
2018/0121280 A1 * 5/2018 Sanders .............. G06F 11/0736
2018/0375603 A1 12/2018 Mayer
2019/0007191 A1 1/2019 Wang
2020/0287969 A1 * 9/2020 Lv ......................... H04J 3/0658
2020/0322906 A1 * 10/2020 Lv ....................... H04W 56/001
2021/0044402 A1 * 2/2021 Gao ...................... H04L 5/0048
2021/0266086 A1 8/2021 Liu et al.
2021/0328696 A1 * 10/2021 Lv ......................... H04J 3/0679
2021/0328698 A1 * 10/2021 Lv ......................... H04J 3/0667
2021/0329330 A1 * 10/2021 Sheen ................ H04N 21/8547
2021/0367693 A1 * 11/2021 S ........................... H04J 3/0697
2021/0391939 A1 * 12/2021 Lamas-Linares ..... H04J 3/0682
2022/0039042 A1 2/2022 Dwivedi et al.
2022/0166531 A1 * 5/2022 Ren ................... H04W 56/0035
2022/0190945 A1 6/2022 Lv et al.
2022/0244907 A1 8/2022 Ramos
2022/0294711 A1 9/2022 Rangarajan et al.
2022/0303034 A1 * 9/2022 Lesi ........................ H04J 3/067
2022/0376808 A1 11/2022 Zinner et al.
2022/0417883 A1 * 12/2022 Fu ............................. H04J 3/12
2023/0057463 A1 2/2023 Vanderydt et al.
2023/0121983 A1 * 4/2023 Bogdan ................. H04L 7/0033 375/354
2023/0130665 A1 4/2023 Royle et al.
2023/0171016 A1 6/2023 Lee
2023/0213357 A1 * 7/2023 Tombez ................. G01D 5/145 324/207.2
2023/0269018 A1 * 8/2023 Dror ..................... H04J 3/0667 370/512
2023/0269161 A1 * 8/2023 Dror ..................... H04L 43/067 709/224
2023/0321526 A1 * 10/2023 Takagaki ............... G05G 9/047 463/37
2023/0362854 A1 * 11/2023 Zhang ................... H04J 3/0688
2024/0031121 A1 * 1/2024 Levi ...................... H04J 3/0658
2024/0031124 A1 1/2024 Levi et al.
2024/0056209 A1 * 2/2024 Lyu ....................... H04J 3/0658
2024/0097812 A1 * 3/2024 Zhang ................... H04J 3/0667
2024/0143020 A1 * 5/2024 Lesi .......................... G06F 1/10
2024/0224205 A1 7/2024 Machireddy
2025/0007636 A1 1/2025 Zang et al.
2025/0211351 A1 6/2025 Singhal et al.
2025/0212145 A1 * 6/2025 Singhal ............. H04W 56/0035
2025/0343614 A1 11/2025 Peng et al.

OTHER PUBLICATIONS

Idrees Z., et al., "IEEE 1588 for Clock Synchronization in Industrial IoT and Related Applications: A Review on Contributing Technologies, Protocols and Enhancement Methodologies", IEEE Access, vol. 8, Aug. 3, 2020, pp. 155660-155678, DOI: 10.1109/ACCESS.2020.3013669.

Manik Singhal and Parthibhan Paramaguru, "System and Method to Dynamically Maintain Mutually Traceable Clocks of Different Types," U.S. Appl. No. 18/390,013, filed Dec. 20, 2023.

Manik Singhal and Parthibhan Paramaguru, "System and Method to Dynamically Monitor Clock Offsets in a Locked State," U.S. Appl. No. 18/390,048, filed Dec. 20, 2023.

Manik Singhal and Parthibhan Paramaguru, "System and Method to Analyze Clock Offsets When Clocks are Unable to Lock," U.S. Appl. No. 18/390,079, filed Dec. 20, 2023.

Manik Singhal and Parthibhan Paramaguru, "System and Method to Determine Sets of Untraceable Clock Domains," U.S. Appl. No. 18/390,127, filed Dec. 20, 2023.

* cited by examiner

CLOCK QUALITY MEASUREMENTS AND MONITORING IN 5G NETWORK

TECHNICAL FIELD

The present disclosure relates generally to a field of clock selection and more particularly, to clock quality measurements and monitoring in fifth generation (5G) networks.

BACKGROUND

In wired/wireless networks, timing nodes may be configured to access one or more communication clocks. The timing nodes may receive one or more communication clocks at a same time. The timing nodes use several memory and computational resources in an attempt to share a same time with other timing nodes in a network. The timing nodes may use an inaccurate clock without realizing that the clock does not maintain the same time with the other timing nodes in the network. Further, timing nodes that use multiple clocks may not be able to synchronize operations with the other timing nodes in the network if the multiple clocks are untraceable with respect to one another. Clocks are considered to be untraceable from one another when timing parameters cannot be matched between the clocks.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
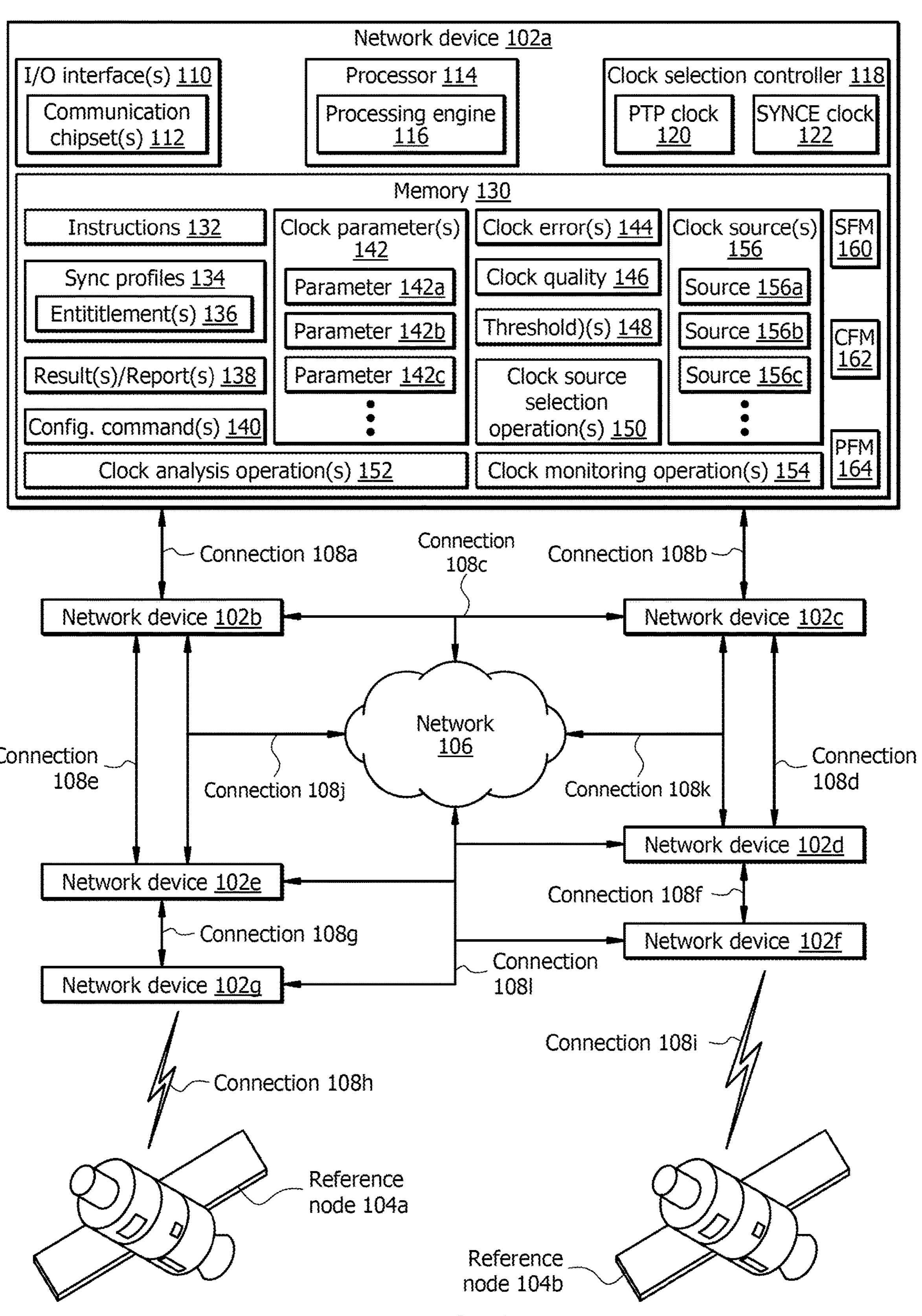
FIG. 1 illustrates a system, according to one or more embodiments of the present disclosure.

In one or more embodiments, systems and methods described herein determine communication clock traceability and synchronicity between two or more clocks. The systems and methods may be configured to perform one or more of the operations during a maintenance window or outside of a maintenance window. The systems and methods are configured to perform clock quality measurements and monitoring operations in one or more wired/wireless networks. For example, a network device may be configured to optimize clock selection in a network by evaluating clock traceability, clock errors, and/or clock offsets in a specific wired/wireless network. In this regard, the systems and methods may be configured to implement multiple error detection processes in an iterative manner to dynamically and/or periodically measure and monitor clocks in the wired/wireless network. The wired/wireless network may be a fifth generation (5G) network, or a New Radio (NR) network as defined by the 3GPP standard.

In accordance with one or more embodiments, the systems and methods may comprise one, some, or all of the embodiments described herein. The systems and methods may be performed by an apparatus, such as a network device. Further, the system may comprise the apparatus. In addition, the systems and methods may be performed as part of a process performed by the apparatus. As a non-limiting example, the apparatus may comprise a memory and a processor communicatively coupled to one another. The memory may be configured to store multiple clock source selection operations configured to facilitate selection of one or more clock sources and multiple clock monitoring operations configured to monitor the clock source selection operations. The processor may be configured to receive a first clock and a second clock from a first network device, obtain a plurality of thresholds associated with the first network device, and obtain a plurality of error detection configuration commands. Each error detection configuration command may be configured to evaluate clock errors in the first clock. Further, the processor may be configured to select a first threshold of the plurality of thresholds, select a first error detection configuration command of the error detection configuration commands, evaluate the first clock based at least in part upon the first threshold and the first error detection configuration command, generate a first result indicating whether the first clock comprises a first clock error greater than the first threshold, and record the first threshold and the first error detection configuration command against a first input reference of the first clock in response to generating the first result indicating that the first clock comprises the first clock error greater than the first threshold.

In certain cases, the processor is further configured to select a second threshold of the plurality of thresholds, select a second error detection configuration command of the plurality of error detection configuration commands, evaluate the second clock based at least in part upon the second threshold and the second error detection configuration command, and generate a second result indicating whether the second clock comprises a second clock error greater than the second threshold.

In some cases, the processor is further configured to record the second threshold and the second error detection configuration command against a second input reference of the first clock in response to generating the second result indicating that the second clock comprises the second clock error greater than the second threshold, select a third threshold of the plurality of thresholds, select the second error detection configuration command of the plurality of error detection configuration commands, evaluate the first clock based at least in part upon the third threshold and the second error detection configuration command, and generate a third result indicating whether the first clock comprises a third clock error greater than the third threshold. In this regard, the second threshold may be lower than the third threshold.

In yet other cases, the clock monitoring operations may be at least partially performed in accordance with one or more configuration commands associated with a Precise Frequency Monitor (PFM). The clock monitoring operations may be at least partially performed in accordance with one or more configuration commands associated with a Single Cycle Monitor (SCM). The clock monitoring operations may be at least partially performed in accordance with one or more configuration commands associated with a Coarse Frequency Monitor (CFM).

In accordance with other embodiments, one or more methods performed by the systems include receiving a first clock and a second clock from a first network device, obtaining multiple thresholds associated with the first network device, and obtaining multiple error detection configuration commands. Each error detection configuration command of the error detection configuration commands may be configured to evaluate clock errors in the first clock. Further, the method includes selecting a first threshold of the thresholds, selecting a first error detection configuration command of the error detection configuration commands, evaluating the first clock based at least in part upon the first threshold and the first error detection configuration command, generating a first result indicating whether the first clock comprises a first clock error greater than the first threshold, and recording the first threshold and the first error detection configuration command against a first input reference of the first clock in response to generating the first result indicating that the first clock comprises the first clock error greater than the first threshold.

In accordance with yet other embodiments, a non-transitory computer readable medium storing instructions that when executed by a processor cause the processor to receive a first clock and a second clock from a first network device, obtain a plurality of thresholds associated with the first network device, and obtain a plurality of error detection configuration commands. Each error detection configuration command may be configured to evaluate clock errors in the first clock. Further, the instructions may further cause the processor to select a first threshold of the plurality of thresholds, select a first error detection configuration command of the error detection configuration commands, evaluate the first clock based at least in part upon the first threshold and the first error detection configuration command, generate a first result indicating whether the first clock comprises a first clock error greater than the first threshold, and record the first threshold and the first error detection configuration command against a first input reference of the first clock in response to generating the first result indicating that the first clock comprises the first clock error greater than the first threshold.

Technical advantages of certain embodiments of this disclosure may include one or more of the following. The systems and methods described herein provide the technical solutions of: 1) increasing traceability of PTP clocks and SyncE clocks in sources around a communication (e.g., wired/wireless) network; 2) detecting whether a selected clock source comprises a rogue clock; 3) determining whether one or more sets of clocks are untraceable from one another; 4) determining whether one or more sets of clocks are traceable from one another; and/or 5) generating alarms identifying ageing or errors in other hardware components. For example, the systems and methods may be configured to dynamically select a PTP clock and a SyncE clock from a same source during maintenance windows and/or outside maintenance windows. As a result, memory resources and processing resources are optimized during one or more clock source selection operations because network devices in the communication network may share a more accurate time with other network devices during one or more of the source selection operations. For example, a network device suffering from clock disparities may prevent clock offsets and improve traceability between clocks by selecting the PTP clock and the SyncE clock from the same source.

In addition, the systems and methods described herein are integrated into practical applications of optimizing processor usage and improving power consumption in the system. Specifically, the system and the method optimize processor usage by monitoring and raising alarms if clock sources comprise clock offsets greater than one or more predetermined thresholds. Further, the systems and methods are integrated into practical applications of tracking multiple clock sources and/or sets of clock domains simultaneously. The systems and methods may prevent losses of processing resources and/or memory resources by dynamically tracking clock statuses in a communication (e.g., wired/wireless) network and dynamically changing clock sources based on a status of a currently selected clock and/or additional clocks in the communication network.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figures 2A, 2B:
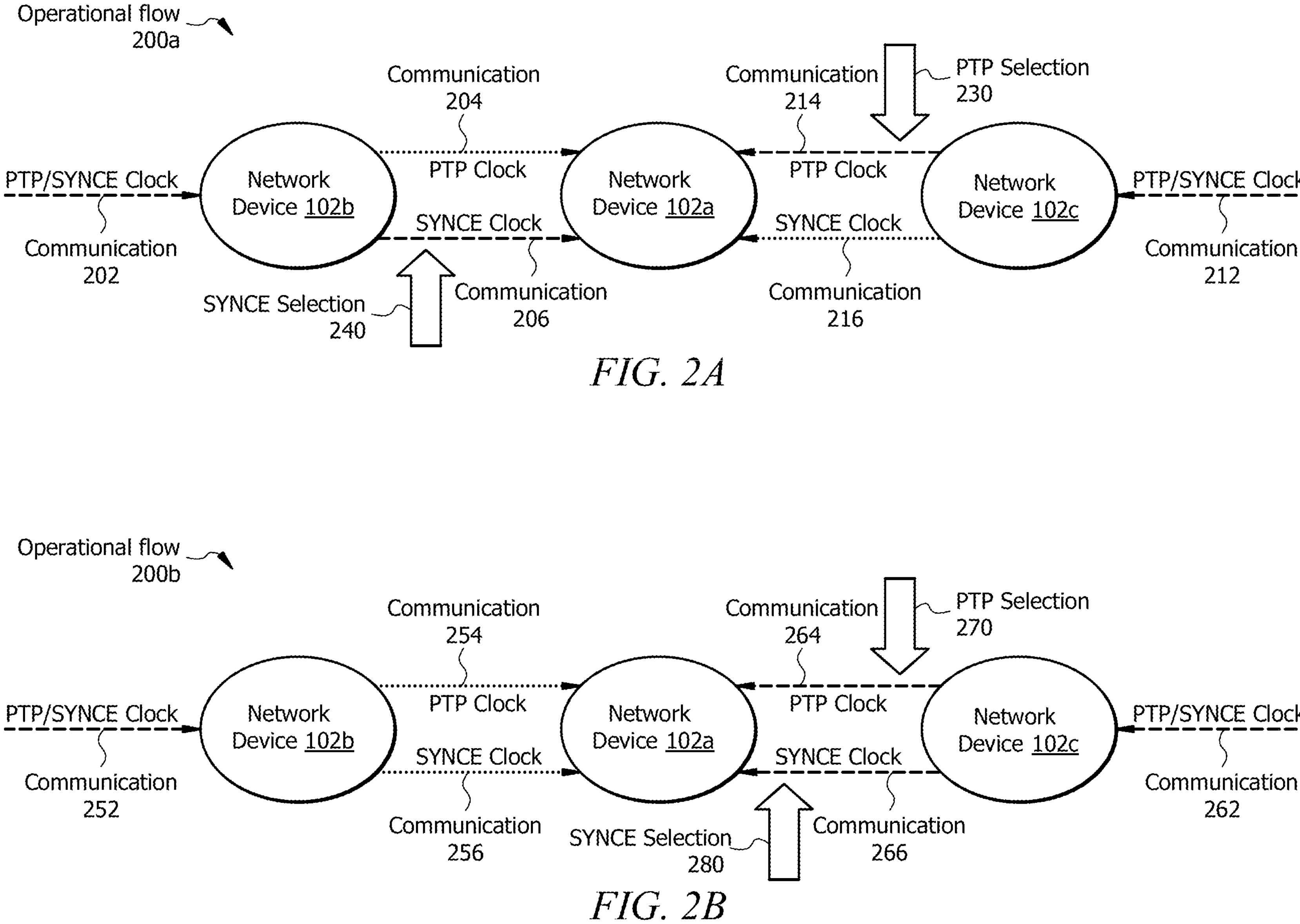
FIGS. 2A and 2B illustrate operational flows of the system of FIG. 1, according to one or more embodiments.
Figure 3:
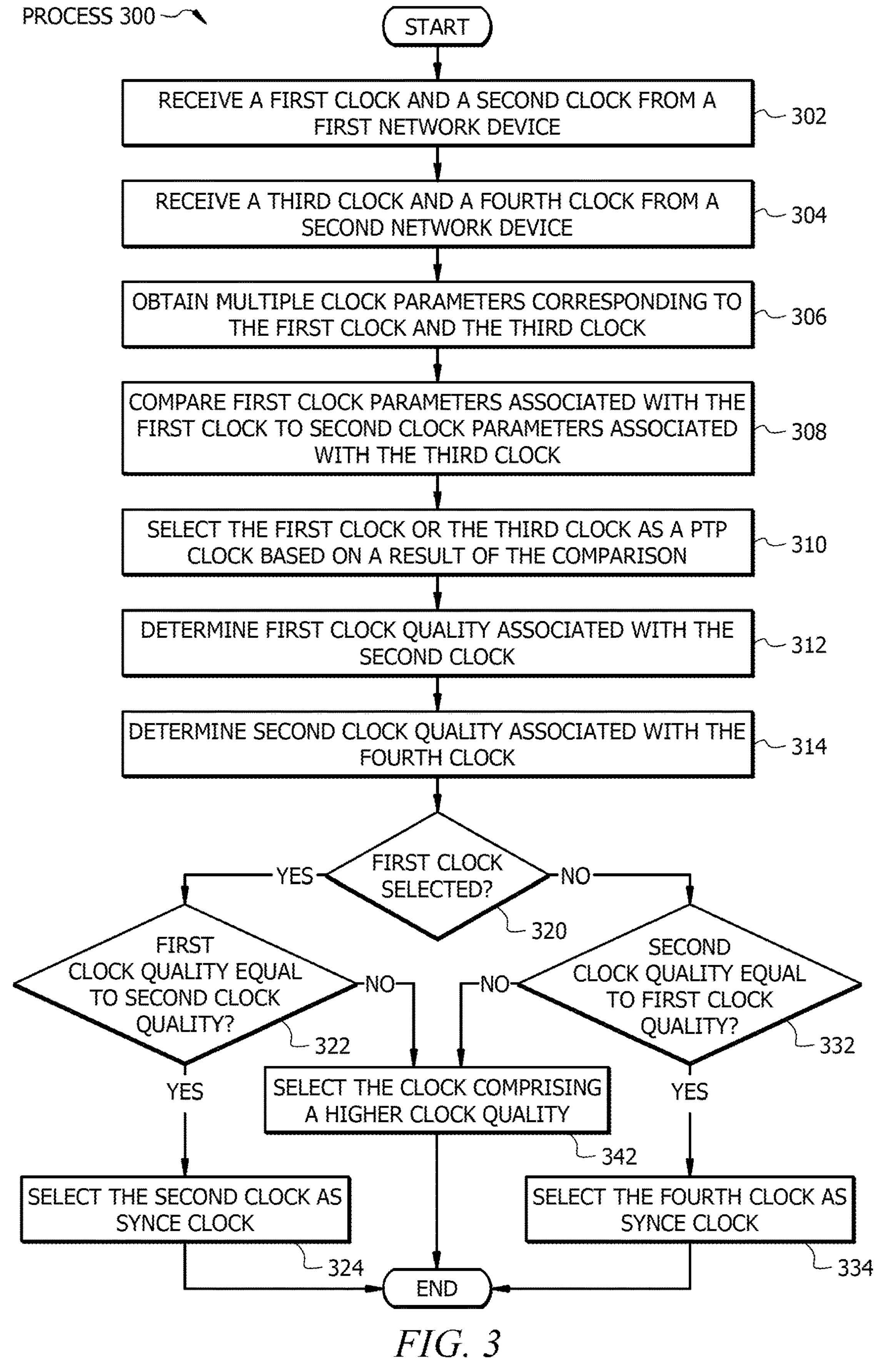
FIG. 3 illustrates a process for performing the operational flows of FIGS. 2A and 2B, according to one or more embodiments of the present disclosure.
Figure 4:
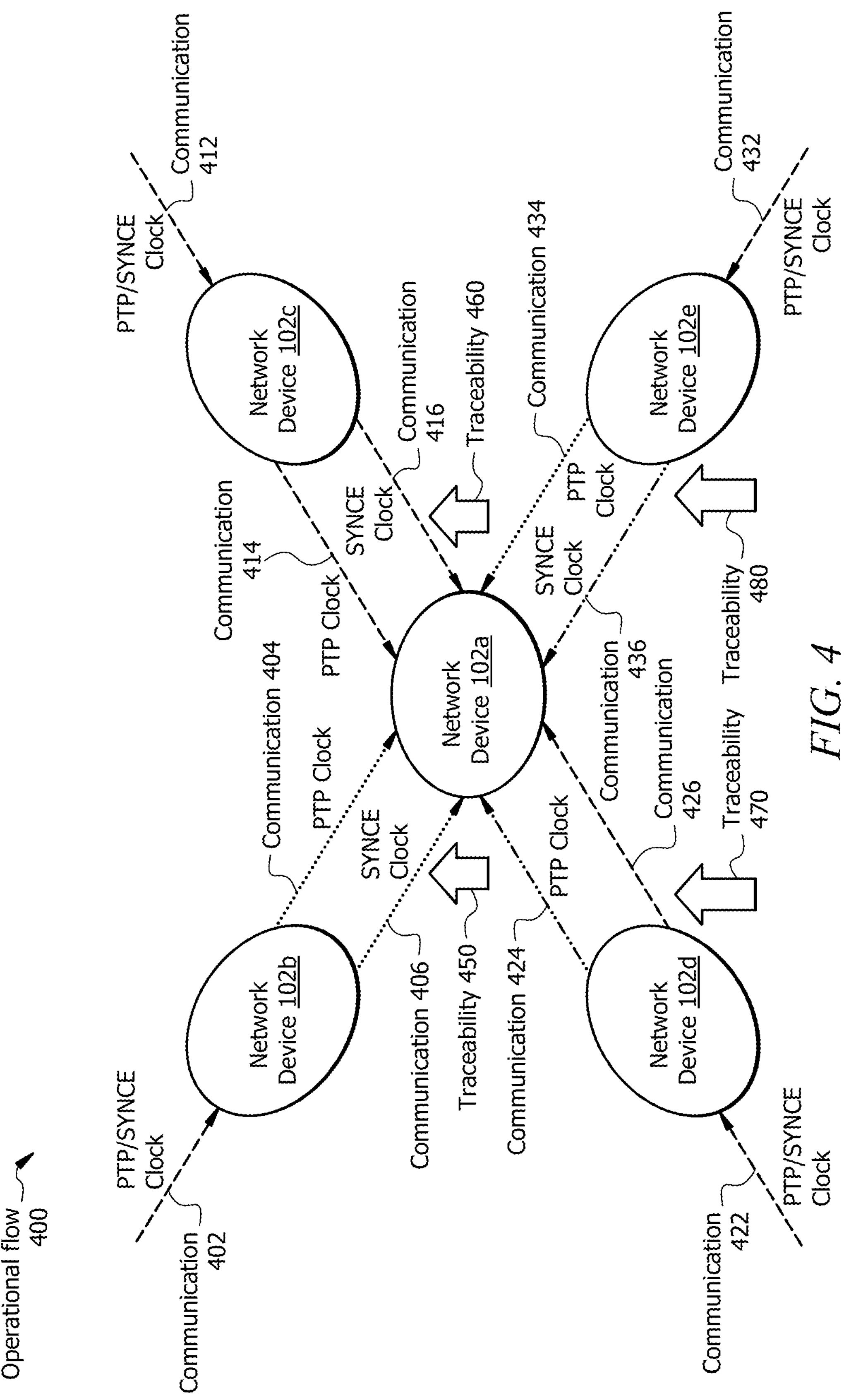
FIG. 4 illustrates an operational flow of the system of FIG. 1, according to one or more embodiments.
Figure 5:
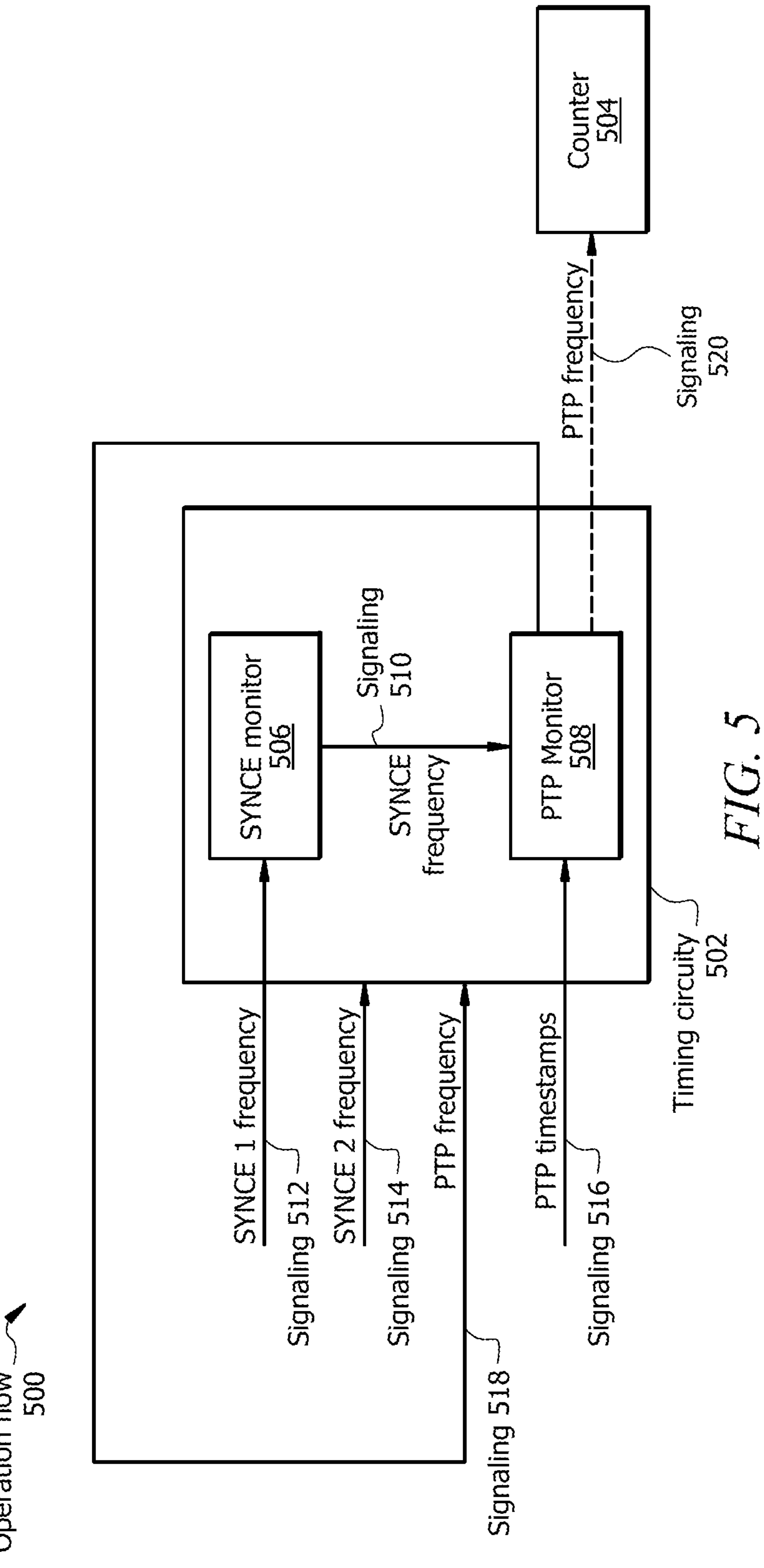
FIG. 5 illustrates an operational flow of the system of FIG. 1, according to one or more embodiments.
Figure 6:
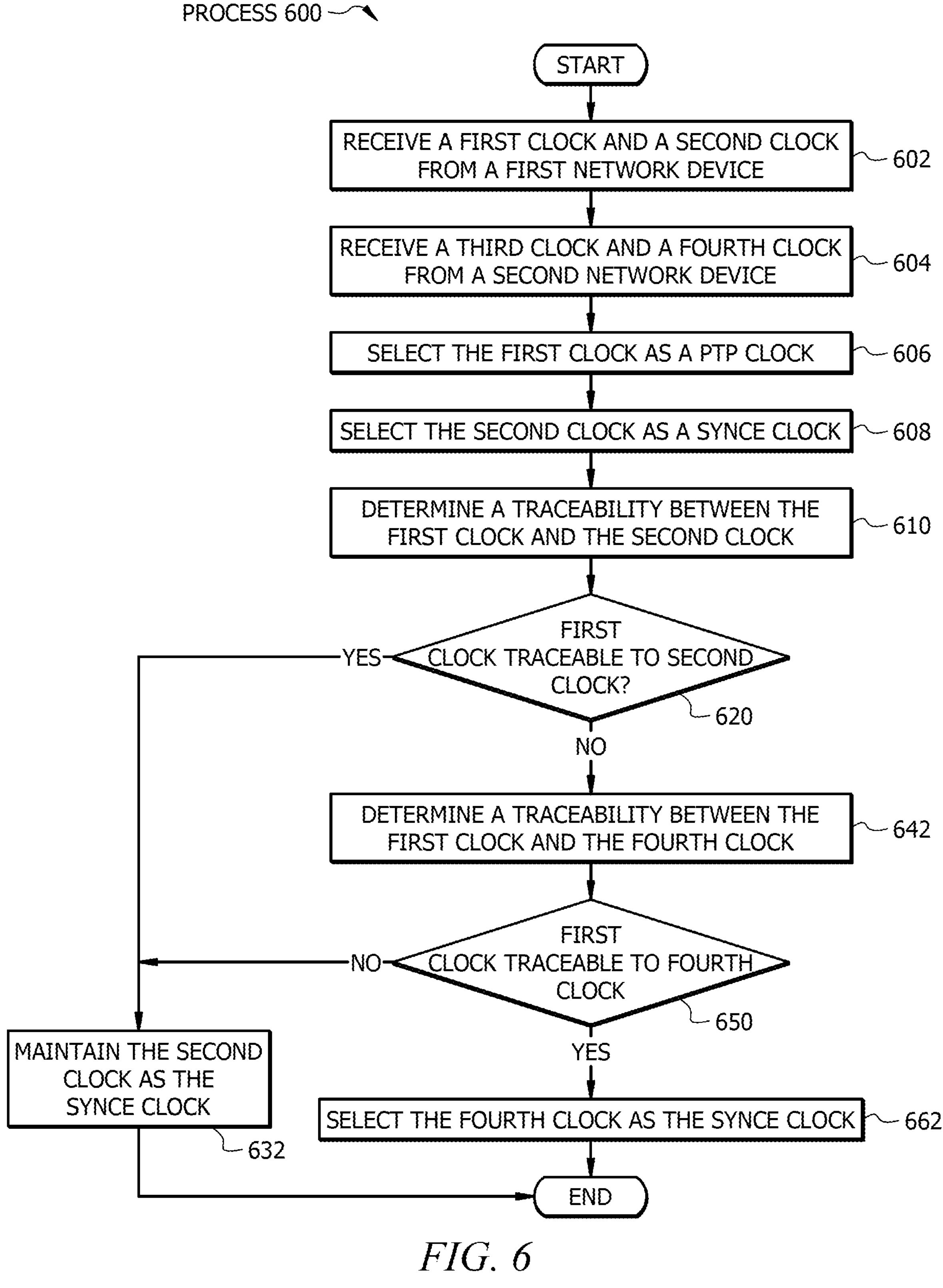
FIG. 6 illustrates a process for performing the operational flows of FIGS. 4 and 5, according to one or more embodiments.
Figure 7:
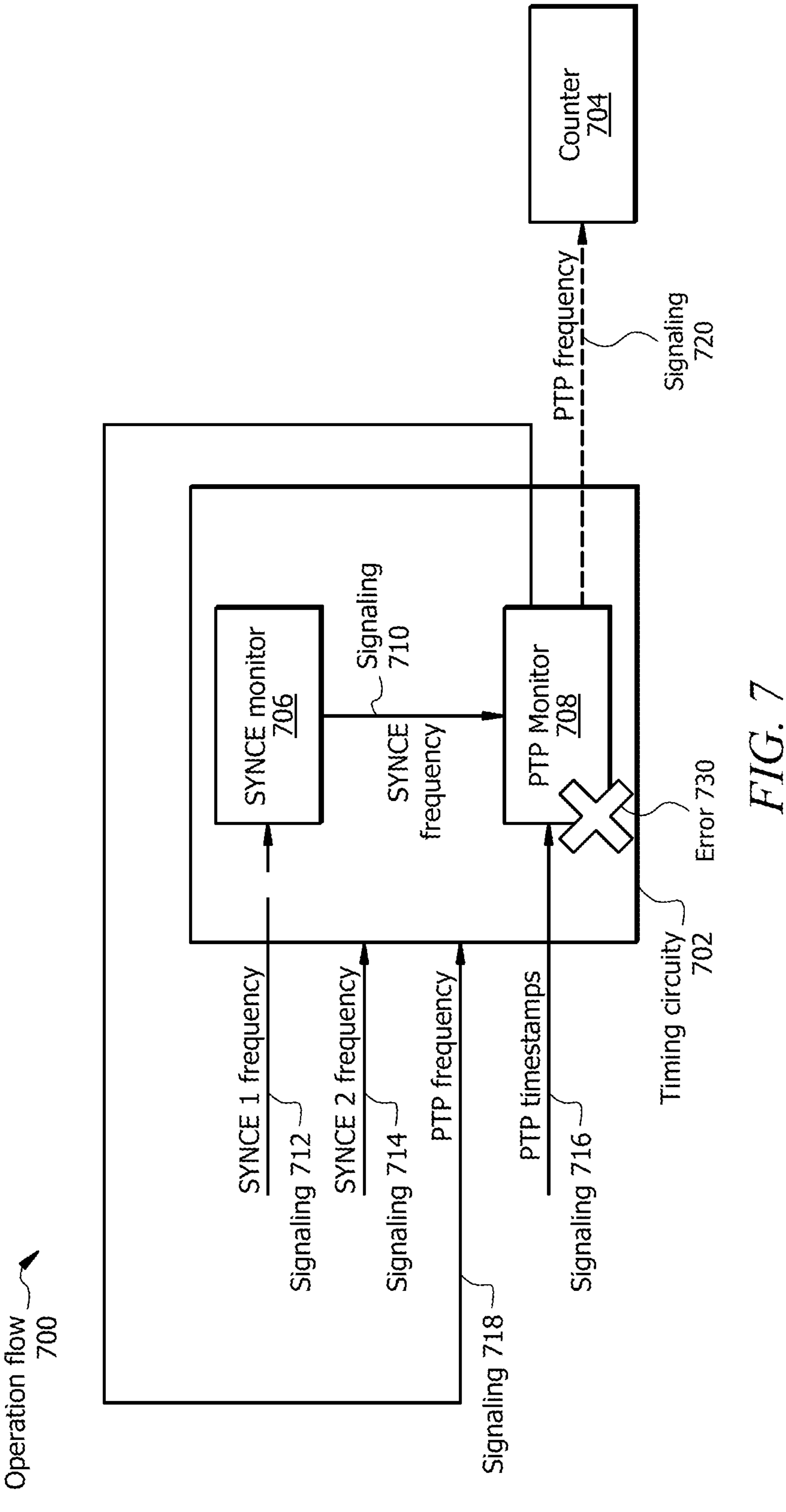
FIG. 7 illustrates an operational flow of the system of FIG. 1, according to one or more embodiments.
Figure 8:
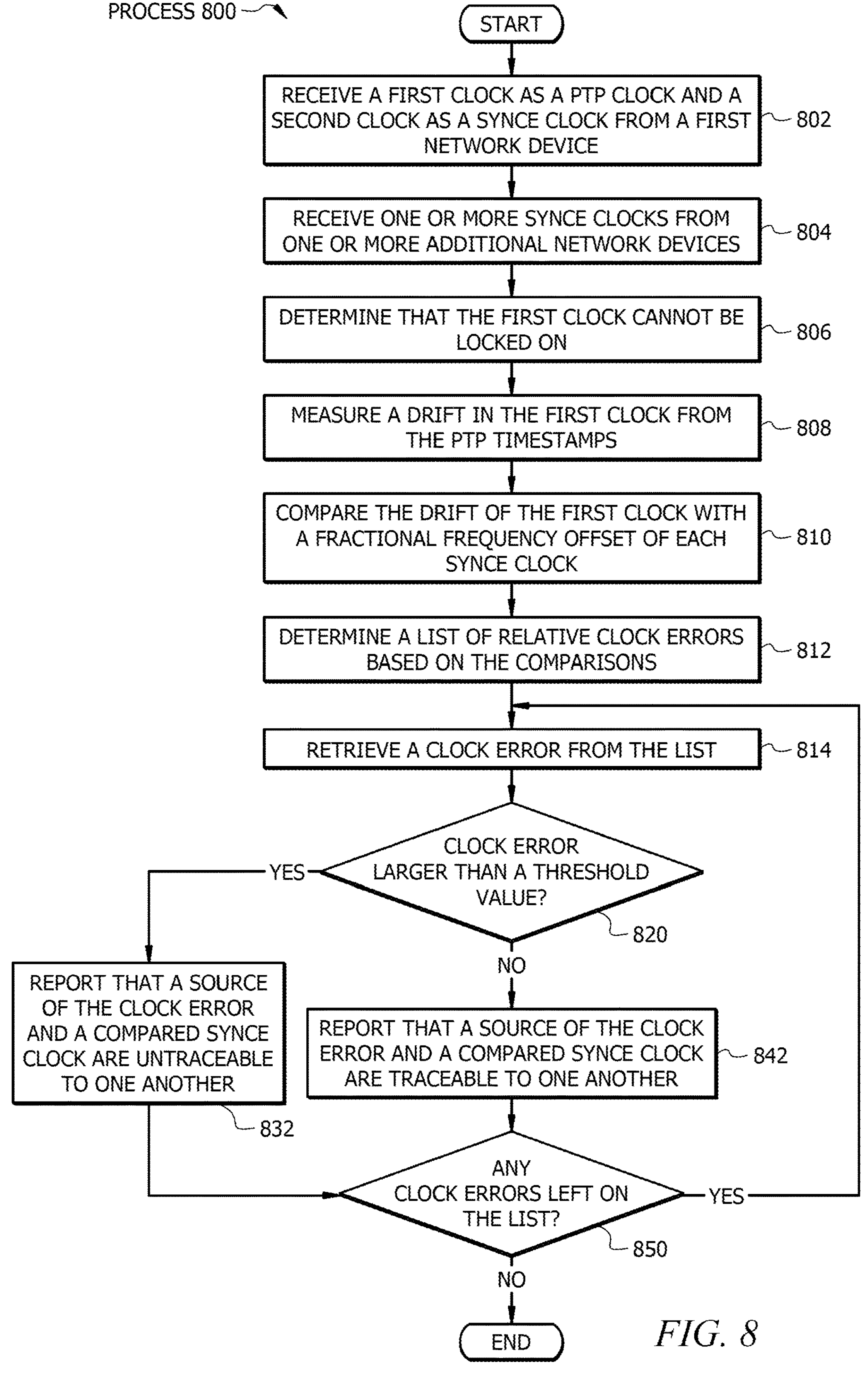
FIG. 8 illustrates a process for performing the operational flow of FIG. 7, according to one or more embodiments.
Figure 9:
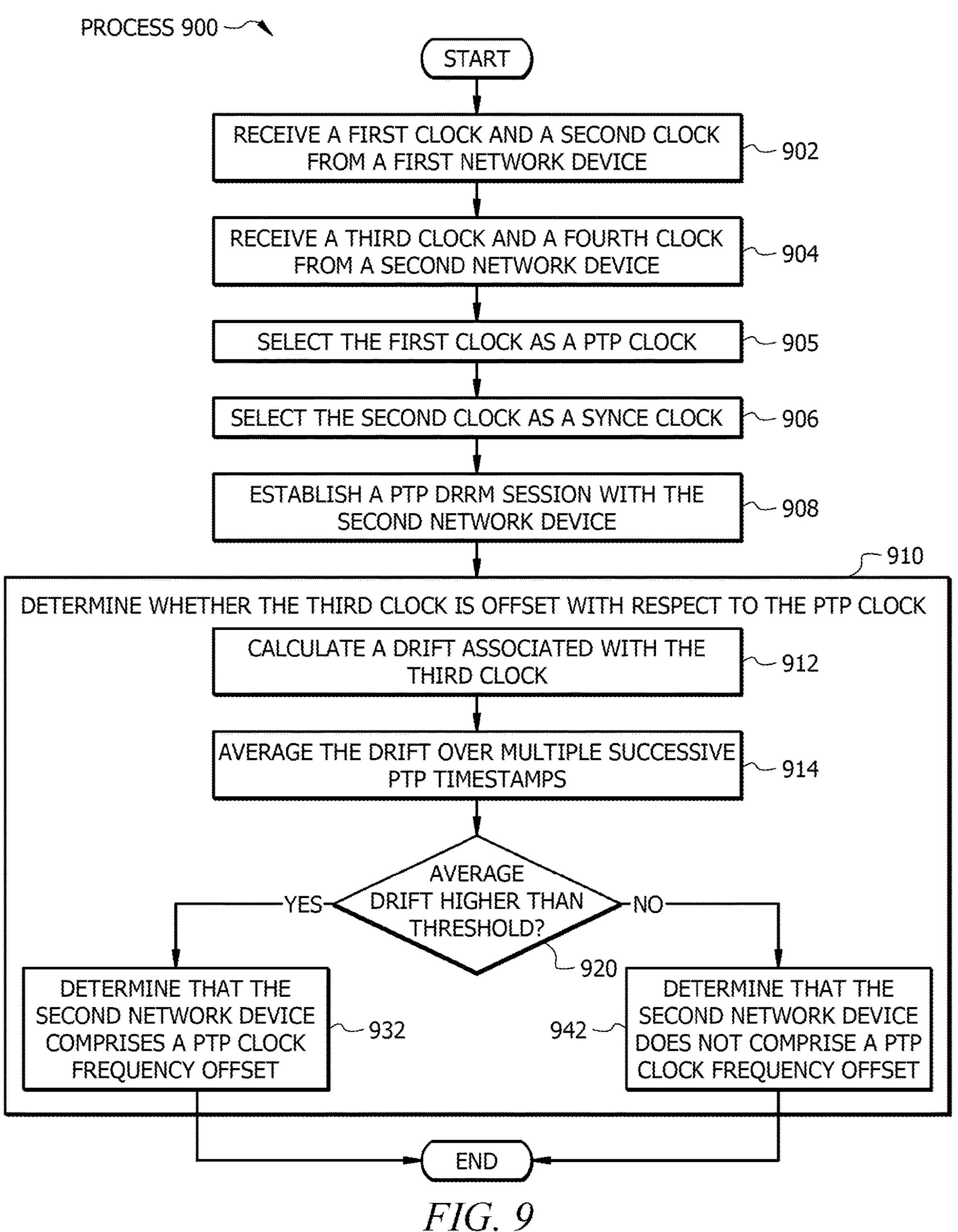
FIG. 9 illustrates a process performed by the system of FIG. 1, according to one or more embodiments.
Figure 10:
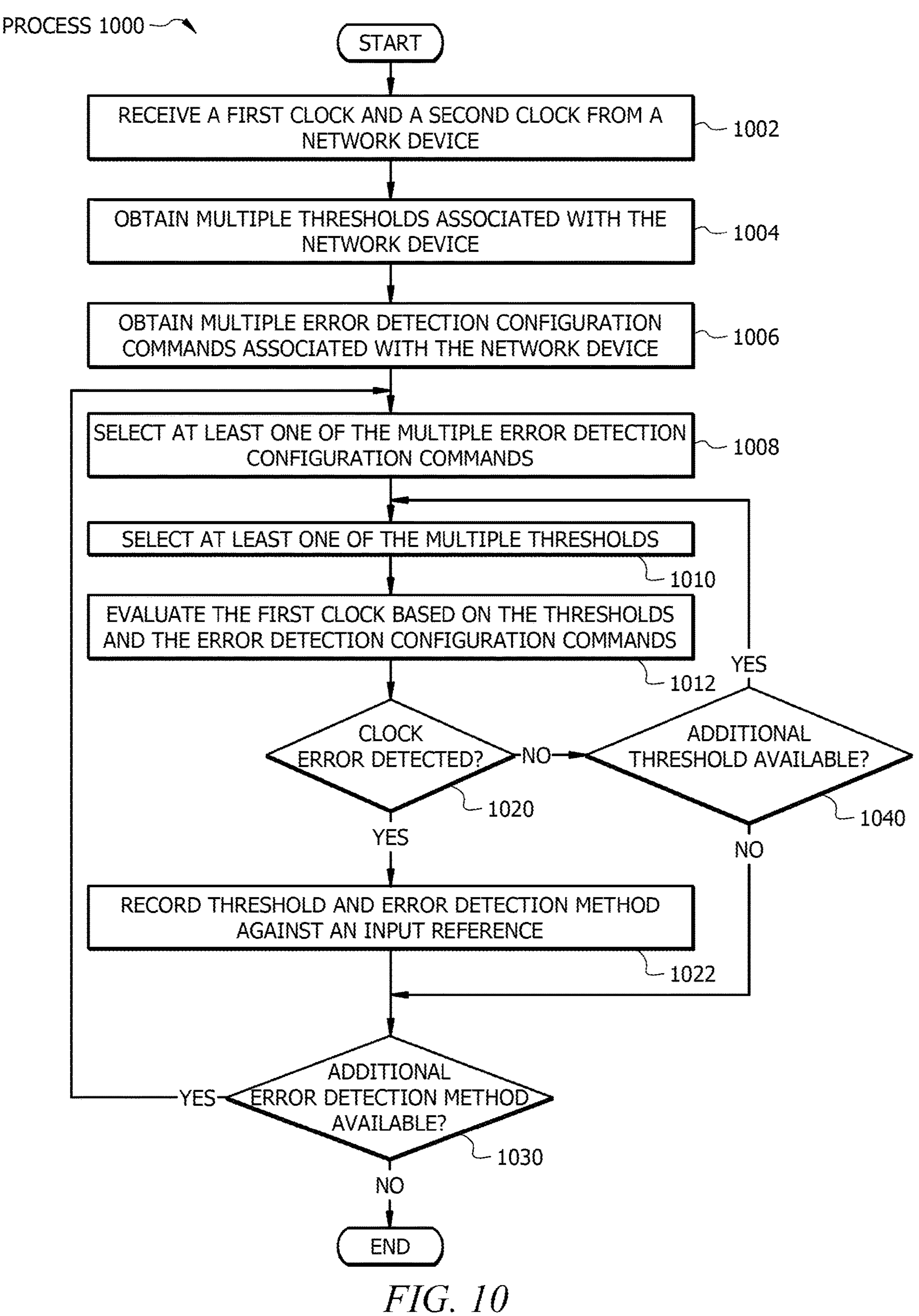
FIG. 10 illustrates a process performed by the system of FIG. 1, according to one or more embodiments.

This disclosure describes systems and methods to perform clock quality measurements and monitoring operations in one or more communication networks. In particular, this disclosure provides various systems and methods to regulate clock selection, clock monitoring, and/or clock traceability in the one or more communication networks. FIG. 1 illustrates a system 100 in which a network device 102*a* controls selection, analysis, and/or monitoring of clocks in a communication network. FIGS. 2A and 2B illustrate an operational flow 200*a* and an operational flow 200*b* in which the network device 102*a* of the system 100 of FIG. 1 share, evaluate, and select one or more clocks from a network device 102*b* and a network device 102*c*. FIG. 3 illustrates a process 300 to perform the operational flow 200*a* of FIG. 2A and the operational flow 200*b* of FIG. 2B. FIG. 4 illustrates an operational flow 400 in which the network device 102*a* of the system 100 of FIG. 1 share, evaluate, and determine traceability of one or more sets of clocks. FIG. 5 illustrates an operational flow 500 in which a timing circuitry 502 in one of the network devices 102 of the system 100 of FIG. 1 is configured to determine traceability among one or more sets of clocks. FIG. 6 illustrates a process 600 to perform the operational flow 400 of FIG. 4 and the operational flow 500 of FIG. 5. FIG. 7 illustrates an operational flow 700 in which a timing circuitry 702 in one of the network devices 102 of the system 100 of FIG. 1 is configured to determine clock errors among one or more sets of clocks. FIG. 8 illustrates a process 800 to perform the operational flow 700 of FIG. 7. FIG. 9 illustrates a process 900 to determine clock offsets between sets of clocks in the system 100 of FIG. 1. FIG. 10 illustrates a process 1000 to determine clock errors in specific clocks of the system 100 of FIG. 1.

FIG. 1 illustrates a system 100 configured to select, analyze, and/or monitor clocks in network devices 102*a*-102*g* (collectively, network devices 102) communicatively coupled with multiple reference nodes 104*a* and 104*b* (collectively, reference nodes 104) and a network 106. The network devices 102 may be hardware and/or software executed by hardware configured to perform one or more operations in the system 100. The network devices 102 may be configured to select, analyze, and monitor clocks in the system 100. The reference nodes 104 may be hardware and/or software executed by hardware configured to provide reference clocks to the network devices 102 (e.g., through satellite Global Navigation Satellite System (GNSS) functionality). The network 106 may comprise multiple nodes interconnected to route, regulate, and modify communications in the system 100. In FIG. 1, the network devices 102, the reference nodes 104, and the network 106 may be communicatively coupled via multiple connections 108*a*-1081 (collectively, connections 108). The connections 108 may be wired and/or wireless communication links established to exchange data and/or commands (e.g., reference clocks or clock information).

The network devices 102 comprise a network device 102*a*, a network device 102*b*, a network device 102*c*, a network device 102*d*, a network device 102*e*, a network device 102*f*, and a network device 102*g*. The network device 102*a* and the network device 102*b* may be communicatively coupled by the connection 108*a*, the network device 102*a* and the network device 102*c* may be communicatively coupled by the connection 108*b*, the network device 102*b* and the network device 102*c* may be communicatively coupled to one another and the network 106 by the connection 108*c*, the network device 102*c* and the network device 102*d* may be communicatively coupled by the connection 108*d*, the network device 102*d* and the network device 102*f* may be communicatively coupled by the connection 108*f*, the network device 102*b* and the network device 102*e* may be communicatively coupled by the connection 108*e*, the network device 102*d* and the network device 102*f* may be communicatively coupled by the connection 108*f*, and the network device 102*e* and the network device 102*g* may be communicatively coupled by the connection 108*g*. Further, the network device 102*g* and the reference node 104*a* may be communicatively coupled by the connection 108*h*, and the network device 102*f* and the reference node 104*b* may be communicatively coupled by the connection 108*i*. The network device 102*b* and the network device 102*e* may be communicatively coupled to one another and the network 106 by the connection 108*j*, and the network device 102*c* and the network device 102*d* may be communicatively coupled to one another and the network 106 by the connection 108*k*. The network device 102*d*, the network device 102*e*, the network device 102*f*, and the network device 102*g* may be communicatively coupled to one another and the network 106 by connection 108*l*.

As a non-limiting example of the network devices 102, the network device 102*a* may comprise one or more Input (I)/Output (O) interfaces 110 comprising one or more communication chipsets 112, at least one processor 114 comprising at least one processing engine 116, at least one clock selection controller 118 comprising a selected PTP clock 120 and a selected SyncE clock 122, and a memory 130. In the example of FIG. 1, the memory 130 comprises one or more instructions 132, one or more synchronization profiles 134 comprising one or more entitlements 136, a compilation of results and/or reports 138, one or more configuration commands 140, multiple clock parameters 142 (shown as a parameter 142*a*, a parameter 142*b*, and a parameter 142*c* among others), one or more clock errors 144, at least one clock quality 146, one or more reference thresholds 148, one or more clock source selection operations 150, one or more clock analysis operations 152, one or more clock monitoring operations 154, one or more clock sources 156 (shown as a source 156*a*, a source 156*b*, and a source 156*c* among others) received from the other network devices 102, a precise frequency monitor (PFM) 160, a single cycle monitor (SCM) 161, a coarse frequency monitor (CFM) 164, and a Step Frequency Monitor (SFM) 166.

In one or more embodiments, the network device 102*a* may take any suitable physical form. As an example and not by way of limitation, the network device 102*a* may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a router device, or a combination of two or more of these. Where appropriate, the network device 102*a* may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more operations of one or more methods described or illustrated herein. As an example, and not by way of limitation, the network device 102*a* may perform in real-time or in batch mode one or more operations of one or more methods described or illustrated herein. The network device 102*a* may perform at different times or at different locations one or more operations of one or more methods described or illustrated herein, where appropriate.

As described above, the network device 102*a* may comprise the one or more I/O interfaces 110, the one or more processors 114, the clock selection controller 118, and the memory 130. The I/O interfaces 110 may comprise hardware, software executed by software, or a combination of both, providing one or more interfaces for communication between the network device 102*a* and one or more I/O devices. The network device 102*a* may include one or more of these I/O devices, where appropriate. One or more of these I/O devices may facilitate communication between a person and the network device 102*a*. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any corresponding suitable I/O interfaces 110. Where appropriate, the I/O interfaces 110 may include one or more device or software drivers enabling the one or more processors 114 to drive one or more of these I/O devices. Although this disclosure describes and illustrates particular I/O interfaces 110, this disclosure contemplates any suitable number of I/O interfaces 110.

In one or more embodiments, the I/O interfaces 110 may comprise a communication interface including hardware, software executed by hardware, or a combination of both providing one or more interfaces for communication (such as, for example, packet-based communication) between the network device 102*a*, the one or more network devices 102*b*-102*f*, the reference nodes 104, the network 106, or one or more additional networks. As an example, and not by way of limitation, the communication interface of the I/O interfaces 110 may include one or more communication chipsets 112 comprising a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the network device 102*a* may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the I/O interfaces 110 may include one or more communication chipsets 112 that communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The network device 102*a* may include any suitable communication interface for any of these networks, where appropriate. Although this disclosure describes and illustrates the I/O interfaces 110 comprising particular communication interfaces, this disclosure contemplates any suitable communication interface.

In some embodiments, the communication chipsets 112 may comprise a security chipset configured to establish one or more physical gates/firewalls at the network device 102*a* or at one or more of the network device 102*b*-102*g*, a wireless chipset configured to provide wireless connectivity capabilities, and a routing chipset configured to regulate data exchanging capabilities by reducing or increasing access to specific types of data. In other embodiments, the security chipset, the wireless chipset, and the routing chipset may be combined into a same chipset sharing common memory resources and processing resources.

In some embodiments, the I/O interfaces 110 may comprise storage and databases communicatively coupled to the one or more processors 114, the clock selection controller 118, and the memory 130. The storage and databases may comprise wired connections that share an internal bandwidth for data packet transmissions inside the network device 102*a* with the memory 130. The storage and databases may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may comprise instructions and data memory for the one or more processors 114.

In particular embodiments, the I/O interfaces 110 may comprise a transceiver (e.g., transmitter, receiver, or a combination of both) configured to implement one or more wireless or wired connectivity protocols. In this regard, the transceiver may comprise antennas comprising hardware configured to establish one or more communication links (e.g., established via the connection 108*a* or the connections 108*b*) between the network device 102*a* and one or more of the network devices 102*b*-102*g*. Although this disclosure describes and illustrates the connections 108, this disclosure contemplates any arrangement of channels for information exchange.

In other embodiments, the I/O interfaces 110 may comprise an interconnect including hardware configured to connect the one or more processors 114, the clock selection controller 118, and the memory 130. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

In some embodiments, the one or more processors 114 comprise hardware for executing instructions (e.g., instructions 132), such as those making up a computer program. As an example, and not by way of limitation, to execute instructions, the one or more processors 114 may retrieve (or fetch) the instructions from an internal register, an internal cache, or the memory 130; decode and execute them; and then write one or more results to an internal register, an internal cache, or the memory 130. Specifically, the one or more processors 114 may include one or more internal caches for data, instructions, or addresses. This disclosure contemplates the one or more processors 114 including any suitable number of internal caches, where appropriate. As an example, and not by way of limitation, the one or more processors 114 may include one or more instruction caches, one or more data caches, and one or more translation lookaside buffers (TLBs). Instructions in the instruction caches may be copies of instructions 132 in the memory 130, and the instruction caches may speed up retrieval of those instructions by the one or more processors 114. Data in the data caches may be copies of data in the memory 130 for instructions executing at the one or more processors 114 to operate via one or more processing engine 116, the results of previous instructions executed at the one or more processors 114 for access by subsequent instructions executing at the one or more processors 114 or for writing to the memory 130, or other suitable data. The data caches may speed up read or write operations by the one or more processors 114. The TLBs may speed up virtual-address translation for the one or more processors 114. In particular embodiments, the one or more processors 114 may include one or more internal registers for data, instructions, or addresses. This disclosure contemplates the one or more processors 114 including any suitable number of suitable internal registers, where appropriate. Where appropriate, the one or more processors 114 may include one or more arithmetic logic units (ALUs); be a multi-core processor; or include one or more additional one or more processors 114. Although this disclosure describes and illustrates a particular processor, this disclosure contemplates any suitable processor.

In one or more embodiments, the one or more processors 114 include hardware, software executed by hardware, or a combination of both, configured to reprovision one or more user devices (not shown) and/or other network devices 102*b*-102*g* to perform one or more tasks in a given device groups. In some embodiments, the one or more processors 114 are configured to determine communication reciprocity for a specific network device 102 within a specific device group. The one or more processors 114 may be a routing devices configured to route resources in the network 106 to additional network devices 102*b*-102*g*. In some embodiments, the one or more processors 114 may be included on a same card or die. In this regard, the one or more processors 114 may be configured to determine types of data exchanged by the network devices 102*b*-102*g*. The types of data may comprise sound, video, or informational details associated with any of the network devices 102*b*-102*g*.

In other embodiments, the processing engine 116 may be software executed by hardware and configured to dynamically aid the network devices 102 to maintain synchronization parameters during synchronization operations in accordance with one or more synchronization profiles 134. The processing engine 116 may be implemented by the one or more processors 114 operating as specialized hardware accelerators. The processing engine 116 may be configured to implement networking-specific processing tasks in custom logic and achieve better performance than typical software implementations. For example, the processing engine 116 may be lookup engines (e.g., using specialized logic), cryptographic coprocessors, content inspection engines, and the like. In some embodiments, the one or more processing engines configured to operate the clock selection controller 118 via execution of one or more of the instructions 132.

In one or more embodiments, the clock selection controller 118 is hardware, software executed by hardware, or a combination of both configured to regulate the types of data shared among two or more of the network devices 102. In some embodiments, the network device 102*a* may assist in establishing a communication link (one or more additional connections 108) between any two or more network devices 102*b*-102*g* and the network device 102*a* to obtain (e.g., receive) one or more clocks. In implementing the communication links, the network device 102*a* may monitor data shared by each of the network devices 102*b*-102*g* and control that specific types of data. In this regard, the clock selection controller 118 may regulate the types of data presented based at least in part upon the types of data that the given network device is configured to share. In some embodiments, the clock selection controller 118 may be configured to schedule timings for transmissions from multiple network devices 102*b*-102*g* to evaluate the data transmitted. In other embodiments, the clock selection controller 118 may be configured to determine multiple clock selection settings (e.g., the synchronization profiles 134) and determine whether a clock from one of the network devices 102*b*-102*g* is configured to share a specific type of data or a specific clock.

The clock selection controller 118 may be configured to execute instructions 132 (e.g., a servo-algorithm) that cause the processor 114 to select the PTP clock 120 and/or SyncE Clock 122 from one or more clocks provided by the network devices 102*b*-102*g* to the network device 102*a*. The clock selection controller 118 may perform one or more clock synchronization operations in compliance with Institute of Electrical and Electronics Engineers (IEEE) 1588 standards. In some embodiments, the network device 102*a* may be configured to receive clocks from multiple network devices 102 acting as clock sources 156. In this regard, the network device 102 may be configured to operate as a time receiver while the clock sources 156 operate as time transmitters. Further, the network devices 102*b*-102*g* may be configured to operate as time receivers when the network device 102*a* operates as a time transmitter.

The network device 102*a* is a non-limiting representation of the network devices 102. In this regard, the network devices 102*b*-102*g* may comprise one or more of the elements described in reference to the network device 102*a*. In some embodiments, the network devices 102*b*-102*g* may comprise less or more of the elements described in reference to the network device 102*a*. In other embodiments, operations described in reference to the processor 114 may be performed by the clock selection controller 118. In yet other embodiments, operations described in reference to the clock selection controller 118 may be performed by the processor 114. Further, the network device 102*a* may be configured forward the PTP clock 120 and/or the SyncE clock 122 to one or more additional network devices 102.

The PTP clock 120 may be a value reference used as a clock over time. The PTP clock 120 may be configured as defined in the IEEE 1588 standard. The PTP clock 120 may be configured to synchronize with nanosecond accuracy real-time clocks of the network devices 102 in the system 100 (e.g., the network 106 or any surrounding networks). Each of the network devices 102 may comprise a corresponding PTP clock 120. In the system 100, the PTP clocks 120 may be organized into a transmitter-receiver hierarchy. In one or more embodiments, the processor 114 and/or the clock selection controller 118 may be configured to identify a port that is connected to the network device 102*a* with the most precise clock. This clock may be referred to as the time transmitter (e.g., master or lead clock reference). All the other devices associated to the network 106 may synchronize corresponding clocks with the time transmitter. These clocks may be referred to as time receivers (e.g., member clocks). The processor 114 and/or the clock selection controller 118 may be configured to constantly exchanged timing messages with a selected time transmitter to ensure continued synchronization. The processor 114 and/or the clock selection controller 118 may be configured to support PTP profiles defined in the International Telecommunication Union (ITU)-Telecommunication sector (T) G.8271-G.8275 standards. Further, the processor 114 and/or the clock selection controller 118 may be configured to maintain the PTP clock 120 based on the IEEE 1588-2008 clock synchronization standards to facilitate clocks in a distributed system to be synched with highly precise clocks.

In one or more embodiments, precision in time synchronization is achieved through packets that are transmitted and received in a session between time transmitters and time receivers. In some embodiments, the synchronization profiles 134 may be configured to implement one or more PTP protocols. The PTP protocols may comprise a method to determine state of ports associated with the network 106 that remain passive (e.g., neither time transmitter nor time receiver), run as a time transmitter (e.g., providing time to other clocks acting as a clock source 156 in the network 106), or run as time receivers (e.g., receiving time from other clocks acting as clock sources 156 in the network 106). The PTP protocols may comprise configuration commands 140 to establish a Delay-Request/Response mechanism (DRRM) and a Peer-delay mechanism that provide mechanisms for time receiver ports to calculate differences between a time of respective own clocks and a time of respective time transmitter clock.

In one or more embodiments, the PTP protocol may comprise frequency and time selection. The processor 114 and the clock selection controller 118 may select one of the clock sources 156 to synchronize a clock frequency of the network device 102*a* by frequency synchronization. The DRRM may facilitate the network device 102*a* to establish one or more DRRM sessions (as defined in the IEEE 1588-2008 standards) to estimate a difference between an own clock-time and clock-times of possible time transmitters.

The SyncE clock 122 may be a value reference used as a clock over time. The SyncE clock 122 may be configured in accordance with the ITU-T standards for computer networking referenced with respect to the PTP clock 120. The synchronization profiles 134 may comprise one or more SyncE protocols configured to facilitate transference of clock signals over the Ethernet physical layer. These signals may be made traceable to an external clock. The SyncE clock 122 may provide a synchronization signal to one or more network devices 102. The SyncE clock 122 may be an additional clock used as a reference time or a backup time in the network device 102*a*. The SyncE clock 122 may be filtered and regenerated by phase locked loop (PLL) at the Ethernet nodes to prevent degradation of the clock when passing through the network 106. The SyncE clock 122 may be deployed alongside the PTP clock 120 to improve timing accuracy of the network 106. The SyncE clock 122 may distribute physical layer frequency synchronization across the network 106, which may be traceable to a primary reference clock (PRC). The SyncE clock 122 may be deployed alongside the PTP clock 120 serves to improve time synchronization performance by reducing jitter and wander, improving holdover performance, and enabling accurate time synchronization across a longer chain of nodes (e.g., the network devices 102*a*-102*g*).

In one or more embodiments, the memory 130 includes mass storage for data or instructions. As an example, and not by way of limitation, the memory 130 may include a hard disk drive (HDD), a floppy disk drive, flash memory, an optical disc, a magneto-optical disc, magnetic tape, or a Universal Serial Bus (USB) drive or a combination of two or more of these. The memory 130 may include removable or non-removable (or fixed) media, where appropriate. The memory 130 may be internal or external to a computer system, where appropriate. In particular embodiments, the memory 130 is non-volatile, solid-state memory. In particular embodiments, the memory 130 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the memory 130 as a mass storage taking any suitable physical form. The memory 130 may include one or more storage control units facilitating communication between the one or more processors 114 and the memory 130, where appropriate. Although this disclosure describes and illustrates particular storage, this disclosure contemplates any suitable storage.

In one or more embodiments, the memory 130 includes a main memory for storing the instructions 132 for the one or more processors 114 to execute or data for the one or more processors 114 to operate on. As an example, and not by way of limitation, the network devices 102 may load the instructions 132 from another memory in the network devices 102*b*-102*g*. The one or more processors 114 may then load the instructions 132 from the memory 130 to an internal register or internal cache. To execute the instructions 132, the one or more processors 114 may retrieve the instructions 132 from the internal register or internal cache and decode them. During or after execution of the instructions 132, the one or more processors 114 may write one or more results (which may be intermediate or final results) to the internal register or internal cache. The one or more processors 114 may then write one or more of those results to the memory 130. In some embodiments, the one or more processors 114 executes only the instructions 132 in one or more internal registers or internal caches or in the memory 130 and operates only on data in one or more internal registers or internal caches or in the memory 130.

In one or more embodiments, the memory 130 includes commands or data associated with one or more specific applications in addition or as part of the instructions 132. In FIG. 1, the memory 130 comprises one or more instructions 132, one or more synchronization profiles 134 comprising one or more entitlements 136, a compilation of results and/or reports 138, one or more configuration commands 140, multiple clock parameters 142 (shown as a parameter 142*a*, a parameter 142*b*, and a parameter 142*c* among others), one or more clock errors 144, at least one clock quality 146, one or more reference thresholds 148, one or more clock source selection operations 150, one or more clock analysis operations 152, one or more clock monitoring operations 154, one or more clock sources 156 (shown as a source 156*a*, a source 156*b*, and a source 156*c* among others) received from the other network devices 102, a precise frequency monitor (PFM) 160, a single cycle monitor (SCM) 161, a coarse frequency monitor (CFM) 164, and a Step Frequency Monitor (SFM) 166. The one or more synchronization profiles 134 may comprise one or more entitlements 136 indicating access to one or more communication preferences. The one or more synchronization profiles 134 may be configured to provide access to clocks from the network devices 102*b*-102*g* in accordance with one or more rules and policies. The network device 102*a* may be configured to perform the clock source selection operations 150, the clock analysis operations 152, and the clock monitoring operations 154 in accordance with the rules and policies established by the synchronization profiles 134. The entitlements 136 may be configured to provide one or more connectivity allowances of the network device 102*a*. For example, in accordance with one of the synchronization profiles 134 corresponding to the network device 102*a*, the network device 102*a* may be configured to select one or more specific clocks from one or more clock sources 156. In this regard, the entitlements 136 associated with a corresponding synchronization profile 134 of the network device 102*a* may indicate that the network device 102*a* is allowed to communicate with one or more components in the network 106 (e.g., core network components or servers comprising specific network functions (NF)) to communicate and route signaling.

In one or more embodiments, the results and/or reports 138 may be outputs comprising reports relating to one or more clock source selection operations 150, one or more clock analysis operations 152, and/or one or more clock monitoring operations 154. In some embodiments, the results and/or reports 138 may be one or more responses generated by the clock selection controller 118 and/or the processor 114 upon selecting, analyzing, and/or monitoring the clock sources 156. The results and/or reports 138 may be provided to one or more of the network devices 102*b*-102*g* or the reference nodes 104. The results and/or reports 138 comprise alerts generated in response to execution of the one or more clock source selection operations 150, the one or more clock analysis operations 152, and/or the one or more clock monitoring operations 154.

In some embodiments, the configuration commands 140 may be procedure or operational guidelines predefined by one or more organizations associated with the network device 102*a*. In other embodiments, the configuration commands 140 may comprise information associated with or updated by the network devices 102*b*-102*g*. In some embodiments, the configuration commands 140 are predefined data exchange parameters set in accordance with one or more organization rules and policies. For example, an organization may predefine in the configuration commands 140 of a given synchronization profile 134 that the network device 102*a* indicating guidance to select the PTP clock 10 and/or the SyncE clock 122 during a communication exchange. In other embodiments, the configuration commands 140 are dynamically modified data exchange parameters by a user associated with the network device 102*a*. For example, a user may set the configuration commands 140 to select clocks of specific types during a communication exchange.

In one or more embodiments, the clock parameters 142 may include classification of one or more different types of clocks. The clock parameters 142 may include clock class information parameters, clock accuracy parameters, or clock configuration data parameters among others. The clock parameters 142 may be classified and analyzed from one or more of the connections 108. In FIG. 1, the clock parameters 142 are shown comprising a clock parameter 142*a*, a clock parameter 142*b*, and a clock parameter 142*c* among others. As shown by the consecutive dots, there may be several additional clock parameters 142 associated with selection of the PTP clock 120 and/or the SyncE clock 122 for the network device 102*a*. In some embodiments, the clock parameters 142 may include one or more configuration settings configured to modify the PTP clock 120 and/or the SyncE clock 122. The PTP clock 120 and/or the SyncE clock 122 may be received from one or more clock sources 156 to the network device 102*a* via the connections 108. In some embodiments, the clock parameters 142 may be actively (e.g., dynamically or immediately) or passively (e.g., updated over time) modified via one or more of the network devices 102*b*-102*g*. The clock parameters 142 may comprise an offset-scale-log-variance as defined by the ITU-T G810 standards.

The one or more clock errors 144 may be one or more differences and/or offsets between two clocks. The clocks may be obtained from one or more of the clock sources 156. The clock errors 144 may be configured to evaluate differences between at least two clocks. In some embodiments, the clock errors 144 may be Fraction Frequency Offsets (FFOs) measured as a level of accuracy of a frequency in accordance with the ITU-T G810 standards. The FFOs may be calculated in accordance with Equation (1) below.

$$y(t) = (v(t) - \text{v\_nom}) / \text{v\_nom} \quad \text{Equation (1)}$$

In Equation (1), y(t) is the FFO at time t, v(t) is the frequency being measured, and v_nom is the nominal frequency (e.g., reference frequency). The FFO may be in units of parts per million (ppm) or parts per billion (ppb). The FFO may be calculated by a change in a phase error of a clock over a period of time. A frequency offset may be represented as a sloping line on a TIE plot, where the gradient of the slope indicates the frequency offset.

In one or more embodiments, the FFOs may be used to derive a Fractional frequency drift (FFD). The FFD may be a rate of change of FFO over time. In this regard, as a non-limiting example, an oscillator that is drifting may be changing in frequency.

The clock errors 144 may be calculated as a two-way time error 2WayTE shown in Equation (2).

$$2WayTE = (\text{T\_1T\_E} + \text{T\_4T\_E}) / 2 \quad \text{Equation (2)}$$

In Equation (2), T_1T_E may be defined as shown in Equation (3) and T_4T_E may be defined as shown in Equation (4).

$$\text{T\_1T\_E} = \text{T\_1} + \text{cable delay} - \text{T\_2} \quad \text{Equation (3)}$$

In Equation (3), T_1 and T_2 are measured timestamps. Further, the cable delay is a predefined or dynamically updated value associated with delays caused by the materials associated with the connections 108.

$$\text{T\_4T\_E} = \text{T\_4} - \text{cable delay} - \text{T\_3} \quad \text{Equation (4)}$$

In Equation (4), T_3 and T_4 are measured timestamps. Further, the cable delay is a predefined or dynamically updated value associated with delays caused by the materials associated with the connections 108.

Further, the clock error 144 may be a time offset from a time transmitter. In this regard, the clock error 144 may be calculated as shown in Equation (5).

$$OffsetFromMaster = ((\text{T\_2} - \text{T\_1}) - (\text{T\_4} - \text{T\_3})) / 2 \quad \text{Equation (5)}$$

In some embodiments, the clock error 144 may be a PTP time error and FFO calculated as shown in Equation (6).

$$PTPTimeError = FFD / (TimeDuration) \quad \text{Equation (6)}$$

In Equation (6), the TimeDuration is a difference between two times. Further, the PTP time error may be calculated as difference between the two-way error at a first time M and a two-way error at a second time N (e.g., the time duration) as shown in Equation (7).

$$FFD = (\text{2WayTE\_N} - \text{2WayTE\_M}) / (\text{T\_N} - \text{T\_M}) \quad \text{Equation (7)}$$

The clock quality 146 may be the quality of one or more clocks provided by the clock sources 156. The clock quality 146 may be dynamically updated or periodically updated over time. The clock quality 146 may be one or more guidance parameters representative of robustness (e.g., reliability over time) of the one or more clocks. The one or more thresholds 148 may be values in the form of fractions and/or percentages that indicate a tolerance for the clock errors 144. In one example, a clock may have a tolerance set by thresholds 148 of ±1%, ±3%, ±5%, ±10%, ±15%, ±17%, ±20%, and ±30% among others.

The one or more clock source selection operations 150 may be one or more operations configured to select one or more clocks from the one or more clock sources 156. The clock source selection operations 150 may be configured to synchronize clocks received from one or more clock sources 156. For example, the clock source selection operations 150 may comprise operations configured to synchronize clocks received from the network device 102*b* and the network device 102*c*. In some embodiments, the clock source selection operations 150 may be configured to compare, control, and select clocks from one or more of the clock sources 156.

The one or more clock analysis operations 152 may be one or more operations configured to evaluate one or more clock parameters 142 associated with clocks from the one or more clock sources 156. The clock analysis operations 152 may be configured to compare clocks to one another to determine the clock errors 144. For example, the clock analysis operations 152 may be configured to evaluate clock offsets between two clocks received from a same clock source 156. In particular, the clock analysis operations 152 may be configured to determine whether one clock from one source 156*a* is offset from one or more of the other clock sources 156. The clock analysis operations 152 may be configured to evaluate changes to the offset over a period of time and/or multiple timestamps (e.g., to calculate drift).

The one or more clock monitoring operations 154 may be one or more operations configured to monitor one or more clock parameters 142 associated with clocks from the one or more clock sources 156. The clock monitoring operations 154 may be configured to maintain a record of one or more changes to the clock parameters 142 associated with a given clock. In some embodiments, the clock monitoring operations 154 may be configured to dynamically and/or periodically update information associated with the clock parameters 142. The clock monitoring operations 154 may be configured to receive information collected and/or evaluated by the PFM 160, the SCM 162, the CFM, and/or the SFM 166.

As described above, the clock sources 156 may be one or more of the network devices 102*b*-102*g*. The one or more clock sources 156 may comprise a clock source 156*a*, a clock source 156*b*, and a clock source 156*c* among others. As shown by the consecutive dots, there may be several additional clock sources 156 associated with clocks received by the network device 102*a*.

The PFM 160, the SCM 162, the CFM 164, and/or the SFM 166 may be one or more commands executed by the processor 114 and/or the clock selection controller 118. The PFM 160 may be configured to measure a frequency accuracy of a reference clock by averaging frequency for a period of time. The SCM 162 may be configured to identify phase jumps in the clocks from the one or more clock sources 156. The CFM 164 may be configured to monitor an input reference frequency over a period of time and quickly detect changes in one or more input frequencies. The SFM 166 may be configured to detect input reference frequency changes with respect to one or more thresholds 148.

In one or more embodiments, the PFM 160, the SCM 162, the CFM 164, and/or the SFM 166 may be configured to evaluate one or more frequency values against possible errors. For example, at a start of the system 100, the PFM 160, the SCM 162, the CFM 164, and/or the SFM 166 may configure values for the thresholds 148 in accordance with a corresponding synchronization profile 134. In some embodiments, one or more input clocks may be disqualified through alarm on crossing the threshold 148. The results and/or reports 138 may be configured to indicate rogue clocks in the network 106, time errors 144 (e.g., drift, PTP time error, and FFO values), unstable SyncE/PTP clock sources 156, and/or untraceable SyncE/PTP clocks.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 106 may be a combination of electronic devices forming a multi-node mesh. As an example and not by way of limitation, one or more portions of the network 106 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 106, or a combination of two or more such networks.

In one or more embodiments, the reference nodes 104 may be a space server comprising one or more space components. In some embodiments, the space components may be configured to perform some or all of the operations described in relation to one or more of the network devices 102. The operations may comprise changes and/or modifications to a transport process in the networks 106. The transport process may comprise one or more operations described in reference to TS 38.211 and/or TS 38.212 of the 3GPP standards. In some embodiments, the reference nodes 104 may be configured to regulate or modify a transport layer shared between the reference nodes 104, the network devices 102, and/or the network 106. In some embodiments, the reference nodes 104 is located orbiting the Earth. The reference nodes 104 may be configured to operate in low orbits, medium orbits, and/or geostationary orbits. In one or more embodiments, the reference nodes 104 are configured to perform one or more of the operations described in reference to the network devices 102. The reference nodes 104 may be configured to control and modify spectrum channels and transport channels used in the system 100. The transport channels may be intermediate channel between logical channels and physical channels. The spectrum channel may be configured to allocate communication transmissions at different bandwidths in a spectrum.

The reference nodes 104 may be configured to determine a real time on at least a portion of the Earth. The reference nodes 104 may configured to operate in low orbits as a low Earth orbit (LEO) satellite with an orbit around Earth with a period of 128 minutes or less (e.g., making at least 11.25 orbits per day) and an eccentricity (e.g., deviation of a curve or orbit from circularity) less than 0.25. The reference nodes 104 may configured to operate in medium orbits as a medium Earth orbit (MEO) satellite with an Earth-centered orbit with an altitude above a low Earth orbit (LEO) and below a high Earth orbit (HEO). The orbit may be between 2,000 Kilometers and 35,786 Kilometers (e.g., about 1,243 miles and 22,236 miles) above sea level. The reference nodes 104 operating as the MEO may comprise an orbital period of equal or greater than 2 hours and less than 24 hours. The reference nodes 104 may configured to operate in geostationary orbits as a geostationary (GEO) satellite is an Earth-orbit placed at an altitude of approximately 22,300 miles or 35,800 kilometers directly above the equator. In this regard, the reference nodes 104 may be configured to revolve in a same direction the Earth rotates (e.g., west to east).

In one or more embodiments, one or more of the reference nodes 104 may appear nearly stationary in the sky to a ground-based observer. These reference nodes 104 may complete one orbit in about 24 hours, which is the same amount of time it takes for the Earth to rotate once on its axis and/or moving in sync with the Earth's rotation. The reference nodes 104 may be configured to receive, amplify, and retransmit radio signals to and from the Earth.

FIGS. 2A and 2B show respective examples of the operational flow 200*a* and the operational flow 200*b*, in accordance with one or more embodiments.

In FIG. 2A, the network device 102*b* receives a PTP clock and a SyncE clock in communication 202. In turn, the network device 102*b* forwards the PTP clock in communication 204 and the SyncE clock in communication 206 to the network device 102*a*. Further, the network device 102*c* receives a PTP clock and a SyncE clock in communication 212 and forwards the PTP clock in communication 214 and the SyncE clock in communication 216 to the network device 102*a*. Herein, the network device 102*a* is shown performing a PTP selection 230 of the PTP clock received in communication 214 and a SyncE selection 240 of the SyncE clock received in communication 206.

In FIG. 2A, the operational flow 200*a* is shown comprising the network device 102*b* configured to receive corresponding PTP/SyncE clocks via the communication 202 and the network device 102*c* configured to receive corresponding PTP/SyncE clocks via the communication 212. In turn, the network device 102*b* provides a first PTP clock to the network device 102*a* via the communication 204 and a first SyncE clock to the network device 102*a* via the communication 206. Further, the network device 102*c* provides a second PTP clock to the network device 102*a* via the communication 214 and a second SyncE clock to the network device 102*a* via the communication 216. In some embodiments, the network device 102*a* evaluates the clock parameters 142 of the first PTP clock and the second PTP clock. The network device 102*a* may be configured to perform a PTP selection 230 that selects the second PTP clock as the PTP clock 120. In other embodiments, the network device 102*a* evaluates the clock parameters 142 of the first SyncE clock and the second SyncE clock. The network device 102*a* may be configured to perform a SyncE selection 240 that selects the first SyncE clock as the SyncE clock 122.

In one or more embodiments, the PTP selection 230 and the SyncE selection 240 may be performed arbitrarily or in accordance with a predefined process. The SyncE selection 240 clock selection may be configured to compare one or more parameters 142 associated with the first SyncE clock and the second SyncE clock in accordance with a corresponding synchronization profile 134 and/or the configuration commands 140. Herein, the network device 102*a* may be configured to perform the SyncE selection 240 based at least in part upon one or more results and/or reports 138 from comparing the parameters 142 for each clock. If all the parameters 142 match between the clocks, then the clock source selection operations 150 may be configured to choose any clock source 156 arbitrarily. The clock source selection operations 150 may be configured to choose to keep a previous selection for the SyncE clock if the network device 102*a* is already locked to one of the clock sources 156.

In FIG. 2B, the network device 102*b* receives a PTP clock and a SyncE clock in communication 252. In turn, the network device 102*b* forwards the PTP clock in communication 254 and the SyncE clock in communication 256 to the network device 102*a*. Further, the network device 102*c* receives a PTP clock and a SyncE clock in communication 262 and forwards the PTP clock in communication 264 and the SyncE clock in communication 266 to the network device 102*a*. Herein, the network device 102*a* is shown performing a PTP selection 270 of the PTP clock received in communication 264 and a SyncE selection 280 of the SyncE clock received in communication 266.

In FIG. 2B, the operational flow 200*b* is shown comprising the network device 102*b* configured to receive corresponding PTP/SyncE clocks via the communication 252 and the network device 102*c* configured to receive corresponding PTP/SyncE clocks via the communication 262. In turn, the network device 102*b* provides a first PTP clock to the network device 102*a* via the communication 254 and a first SyncE clock to the network device 102*a* via the communication 256. Further, the network device 102*c* provides a second PTP clock to the network device 102*a* via the communication 264 and a second SyncE clock to the network device 102*a* via the communication 266. In some embodiments, the network device 102*a* evaluates the clock parameters 142 of the first PTP clock and the second PTP clock. The network device 102*a* may be configured to perform a PTP selection 270 that selects the second PTP clock as the PTP clock 120. In other embodiments, the network device 102*a* evaluates the clock parameters 142 of the first SyncE clock and the second SyncE clock. The network device 102*a* may be configured to perform a SyncE selection 280 that selects the second SyncE clock as the SyncE clock 122. Herein, the network device 102*a* may be configured to select the second SyncE upon identifying that the PTP selection 270 comprised selecting the second PTP clock such that the PTP clock 120 and the SyncE clock 122 are selected from the network device 102*c*.

In one or more embodiments, the PTP selection 230 and the SyncE selection 240 may be performed instead of performing an arbitrary selection or staying with the previously locked clock source 156. During initial convergence when a node is booting up, SyncE selection may occur faster under the operational flow 200*b*. At run-time, whenever there is a change in the PTP source, the SyncE source may switch from the previously selected source to a new source providing the PTP clock 120. The SyncE source switching may be similar to a short-term transient requirement as described in the ITU-T G.8262 standards.

In one or more embodiments, the network device 102*b* may be configured to select a same clock source 156 for both the PTP clock 120 and the SyncE clock 122, but the selected clock source 156 may receive corresponding PTP/SyncE clocks from two different sources that are untraceable to one another. In some embodiments, the network device 102*a* may be configured to operate one or more phase-locked loop (PLL) clock generators configured to provide a functionality to measure frequency offsets between different clock sources 156. The frequency offsets may be calculated either relative to a frequency of an on-board local oscillator, or relative to an internal digital PPL (DPLL) on the network device 102*a*.

FIG. 3 shows an example flowchart of a process 300 to perform clock quality measurements and monitoring operations in one or more communication networks, in accordance with one or more embodiments. Modifications, additions, or omissions may be made to the process 300. The process 300 may include more, fewer, or other operations than those shown below. For example, operations may be performed in parallel or in any suitable order. While at times discussed as the network devices 102 or the reference nodes 104, the processor 114, the clock selection controller 118, or components of any of thereof, any suitable system or components of the system 100 may perform one or more operations of the process 300. For example, one or more operations of the process 300 may be implemented, at least in part, in the form of software instructions 132 of FIG. 1, stored on a non-transitory computer readable medium, tangible, machine-readable media (e.g., memory 130 of FIG. 1) that when run by one or more processors (e.g., one or more processors 114 of FIG. 1) may cause the one or more processors to perform the operations 302-342.

In one or more embodiments, the process 300 may be configured to dynamically maintain mutually traceable clocks of different types. For example, the network device 102*a* may be configured to dynamically select clocks of different types (e.g., the PTP clock 120 and the SyncE clock 122) from a same clock source 156 (e.g., another of the network devices 102). In this regard, the network device 102*a* may be configured to select the PTP clock 120 and the SyncE clock from a same source.

Herein, referencing the operational flow 200*a* and the operational flow 200*b* as non-limiting examples, the network device 102*a* is configured to dynamically maintain mutually traceable clocks of different types. The process 300 starts at operation 302, where the network device 102*a* receives a first clock (e.g., the first PTP clock via the communication 254 in the operational flow 200*b*) and a second clock (e.g., the first SyncE clock via the communication 256 in the operational flow 200*b*) from the network device 102*b*. At operation 304, the network device 102*a* receives a third clock (e.g., the second PTP clock via the communication 264 in the operational flow 200*b*) and a fourth clock (e.g., the second SyncE clock via the communication 266 in the operational flow 200*b*) from the network device 102*c*. At operation 306, the network device 102*a* obtains multiple clock parameters 142 corresponding to the first clock and the third clock. At operation 308, the network device 102*a* compares first clock parameters associated with the first clock to second clock parameters associated with the third clock. At operation 310, the network device 102*a* selects the first clock or the third clock as the PTP clock 120 based on a result of the comparison. At operation 312, the network device 102*a* determines a clock quality 146 associated with the second clock (e.g., a first clock quality). At operation 314, the network device 102*a* determines a clock quality 146 associated with the fourth clock (e.g., a second clock quality).

The process 300 continues at operation 320, where the network device 102*a* determines whether the first clock is selected. If the network device 102*a* determines that the first clock is selected (e.g., YES), the process 300 continues to operation 322. If the network device 102*a* determines that the first clock is not selected (e.g., NO), the process 300 proceeds to operation 332.

At operation 322, the process 300 determines whether the first clock quality corresponding to the second clock is equal to the second clock quality corresponding to the fourth clock. If the network device 102*a* determines that the first clock quality corresponding to the second clock is equal to the second clock quality corresponding to the fourth clock (e.g., YES), the process 300 continues to operation 324. If the network device 102*a* determines that the first clock quality corresponding to the second clock is not equal to the second clock quality corresponding to the fourth clock (e.g., NO), the process 300 proceeds to operation 342. The process 300 ends at operation 324, where the network device 102*a* selects the second clock as the SyncE clock 122.

At operation 332, the process 300 determines whether the second clock quality corresponding to the fourth clock is equal to the first clock quality corresponding to the second clock. If the network device 102*a* determines that the second clock quality corresponding to the fourth clock is equal to the first clock quality corresponding to the second clock (e.g., YES), the process 300 continues to operation 334. If the network device 102*a* determines that the second clock quality corresponding to the fourth clock is not equal to the first clock quality corresponding to the second clock (e.g., NO), the process 300 proceeds to operation 342. The process 300 ends at operation 334, where the network device 102*a* selects the fourth clock as the SyncE clock 122.

In some embodiments, the process 300 ends at operation 342, where the network device 102*a* selects the second clock or the fourth clock as the SyncE clock 122. In this regard, the network device 102*a* selects the second clock as the SyncE clock 122 if the first clock quality corresponding to the second clock is determined to be greater than the second clock quality of the fourth clock. Further, the network device 102*a* selects the fourth clock as the SyncE clock 122 if the second clock quality corresponding to the fourth clock is determined to be greater than the first clock quality of the second clock.

FIG. 4 shows an example of the operational flow 400, in accordance with one or more embodiments. In FIG. 4, the network device 102*b* receives a PTP clock and a SyncE clock in communication 402. In turn, the network device 102*b* forwards the PTP clock in communication 404 and the SyncE clock in communication 406 to the network device 102*a*. Further, the network device 102*c* receives a PTP clock and a SyncE clock in communication 412 and forwards the PTP clock in communication 414 and the SyncE clock in communication 416 to the network device 102*a*. The network device 102*d* receives a PTP clock and a SyncE clock in communication 422 and forwards the PTP clock in communication 424 and the SyncE clock in communication 426 to the network device 102*a*. The network device 102*e* receives a PTP clock and a SyncE clock in communication 432 and forwards the PTP clock in communication 434 and the SyncE clock in communication 436 to the network device 102*a*. Herein, the network device 102*a* is shown determining a traceability 450 between the PTP clock of communication 404 and the SyncE clock of communication 406, determining a traceability 460 between the PTP clock of communication 414 and the SyncE clock of communication 416, determining a traceability 470 between the PTP clock of communication 424 and the SyncE clock of communication 426, and determining a traceability 480 between the PTP clock of communication 434 and the SyncE clock of communication 436.

In FIG. 4, the operational flow 400 is shown comprising the network device 102*b* configured to receive corresponding PTP/SyncE clocks via the communication 402, the network device 102*c* configured to receive corresponding PTP/SyncE clocks via the communication 412, the network device 102*d* configured to receive corresponding PTP/SyncE clocks via the communication 422, and the network device 102*e* configured to receive corresponding PTP/SyncE clocks via the communication 432. The network device 102*b* may provide a first PTP clock to the network device 102*a* via the communication 404 and a first SyncE clock to the network device 102*a* via the communication 406. The network device 102*c* may provide a second PTP clock to the network device 102*a* via the communication 414 and a second SyncE clock to the network device 102*a* via the communication 416. The network device 102*d* may provide a third PTP clock to the network device 102*a* via the communication 424 and a third SyncE clock to the network device 102*a* via the communication 426. The network device 102*e* may provide a fourth PTP clock to the network device 102*a* via the communication 434 and a fourth SyncE clock to the network device 102*a* via the communication 436.

In some embodiments, the network device 102*a* evaluates the clock parameters 142 of the first PTP clock and the second PTP clock. The network device 102*a* may be configured to determine the traceability 450 corresponding to a relation between the first PTP clock and the first SyncE clock, determine the traceability 460 corresponding to a relation between the second PTP clock and the second SyncE clock, determine the traceability 470 corresponding to a relation between the third PTP clock and the third SyncE clock, and determine the traceability 480 corresponding to a relation between the fourth PTP clock and the fourth SyncE clock. In other embodiments, the network device 102*a* evaluates one or more clock parameters 142 of each clock pair to determine the corresponding traceability. The network device 102*a* may be configured to compare the traceability 450, the traceability 460, the traceability 470, and the traceability 480 and select the PTP clock 120 and the SyncE clock 122 as described in FIG. 1 based at least in part upon the results of the comparison. In some embodiments, each of the traceability 450, the traceability 460, the traceability 470, and the traceability 480 may be a sequence of values following a pattern.

In one or more embodiments, the traceability may be determined from the perspective of the network device 102*a* for multiple SyncE clocks. In particular, the network device 102*a* may be configured to compare two or more SyncE clocks received over a period of time and determine whether any of the SyncE clocks are traceable to one another. For example, the network device 102*a* may be configured to receive a first SyncE clock in the communication 406 from the network device 102*b*, a second SyncE clock in the communication 416 from the network device 102*c*, a third SyncE clock in the communication 426 from the network device 102*d*, and a fourth SyncE clock in the communication 436 from the network device 102*e*. In the example, the network device 102*a* may be configured to compare the first SyncE clock, the second SyncE clock, the third SyncE clock, and the fourth SyncE clock to one another. Herein, the network device 102*a* may be configured to determine whether any of the SyncE clocks are offset with respect to the others. In this regard, the network device 102*a* may generate a quality report on the multiple SyncE clocks indicating whether any of the SyncE clocks are offset with respect to the others.

In one or more embodiments, the network device 102*a* is configured to operate in a hybrid mode where the network device 102*a* makes frequency adjustments over an available SyncE clock 122 to derive a PTP frequency which aligns with the PTP clock 120 of a PTP server (e.g., one of the reference nodes 104). In some embodiments, the network device 102*a* may be configured to select the SyncE clock 122 and the PTP clock 120 based at least in part upon determining that two clocks from one of the other network devices are traceable to one another (e.g., with no offset between them). In cases where the network device 102*a* is locked to a PTP server, the network device 102*a* may be configured to assess the traceability between two clocks by determining magnitude adjustments for the frequency of one of the clocks (i.e., the clock offset between an input SyncE clock and the derived PTP clock). Further, the clock offset between the PTP clock and the other available (but not selected) SyncE clocks to the node may be compared to find better suited clocks traceable to one another.

FIG. 5 shows an example of a timing circuitry 502 configured to update a counter 504, in accordance to one or more embodiments. The timing circuitry 502 comprises a SyncE monitor 506 configured to monitor SyncE clocks and a PTP monitor 508 configured to monitor PTP timestamps. The SyncE monitor 506 may be communicatively coupled to the PTP monitor 508 and configured to share SyncE frequency via signaling 510. The timing circuitry 502 may receive a SyncE1 frequency via signaling 512 and a SyncE2 frequency via signaling 514. The SyncE monitor 506 may select the signaling 512 out of multiple signaling for frequency synchronization. Further, the timing circuitry 502 may receive PTP timestamps from one or more clock sources 156 via signaling 516. The PTP monitor 508 may provide a PTP clock via signaling 518 as feedback to the timing circuitry 502. The timing circuitry 502 may calculate a PTP frequency based on the signaling 512-518. The timing circuitry may provide the PTP clock to the counter 504 via the signaling 520.

In one or more embodiments, the network device 102*a* comprises the timing circuitry 502. The timing circuitry 502 may be configured to determine a SyncE frequency in signaling 510 between the SyncE monitor 506 and the PTP monitor 508 based on the SyncE1 frequency provided via the signaling 512. In turn, the PTP frequency may be provided to the counter 504 via the signaling 520. The counter 504 may allow for maintenance of the PTP clock 120.

In some embodiments, the timing circuitry 502 may be locked to a PTP source (e.g., via the signaling 516 receiving PTP timestamps) and a SyncE source (e.g., via the signaling 512 receiving the SyncE1 frequency). In this regard, a PTP frequency of the PTP clock 120 may be provided as a feedback in the signaling 518. The PTP frequency via the signaling 518 may be compared to a SyncE2 frequency via the signaling 514. Herein, the timing circuitry may compare the PTP clock 120 with all available SyncE sources using the FFO. This measurement is done at runtime without bringing down the timing services. The frequency offsets of other available SyncE clocks gives insights into corresponding traceability. If the offset is higher than a given threshold 148 between two clocks, then at least one of the clocks is flagged as being from a different source.

FIG. 6 shows an example flowchart of a process 600 to dynamically monitor clock offsets in a locked state, in accordance with one or more embodiments. Modifications, additions, or omissions may be made to the process 600. The process 600 may include more, fewer, or other operations than those shown below. For example, operations may be performed in parallel or in any suitable order. While at times discussed as the network devices 102 or the reference nodes 104, the processor 114, the clock selection controller 118, or components of any of thereof, any suitable system or components of the system 100 may perform one or more operations of the process 600. For example, one or more operations of the process 600 may be implemented, at least in part, in the form of software instructions 132 of FIG. 1, stored on a non-transitory computer readable medium, tangible, machine-readable media (e.g., memory 130 of FIG. 1) that when run by one or more processors (e.g., one or more processors 114 of FIG. 1) may cause the one or more processors to perform the operations 602-662.

In one or more embodiments, the processor 600 may be configured to dynamically monitor clock offsets in a locked state. For example, the network device 102*a* may be configured to receive a pair of clocks from each surrounding network device (e.g., the network devices 102*b*-102*e*), determine offsets between the clocks in each pair, and select a clock pair determined to comprise higher traceability than the rest. In this regard, the network device 102*a* may be configured to dynamically determine traceability in multiple clock pairs, and select a clock pair comprising higher traceability with respect to the rest.

Herein, referencing the operational flow 400 and the operational flow 500 as non-limiting examples, the network device 102*a* is configured to dynamically monitor clock offsets in a locked state. The process 600 starts at operation 602, where the network device 102*a* receives a first clock via the communication 404 and a second clock via the communication 406 from the network device 102*b*. At operation 604, the network device 102*a* receives a third clock via the communication 414 and a fourth clock via the communication 416 from the network device 102*c*. At operation 606, the network device 102*a* select the first clock as the PTP clock 120. At operation 608, the network device 102*a* selects the second clock as the SyncE clock 122. At operation 610, the network device 102*a* determines the traceability 450 between the first clock and the second clock.

The process 600 continues at operation 620, where the network device 102*a* determines whether the first clock is traceable to the second clock. If the first clock is traceable to the second clock (e.g., YES), the process 600 continues to operation 632. The process 600 ends at operation 632, where the network device 102*a* maintains the second clock as the SyncE clock 122. If the network device 102*a* determines that the first clock is not traceable to the second clock (e.g., NO), the process 600 proceeds to operation 642. At operation 642, the network device 102*a* determines the traceability 460 between the first clock and the fourth clock. In one or more embodiments, if additional clocks are available, the process 600 may repeat operation 642 and operation 650 to check if any of the additional clocks comprise traceability with the first clock.

The process 600 continues at operation 650, where the network device 102*a* determines whether the first clock is traceable to the fourth clock. If the first clock is traceable to the fourth clock (e.g., YES), the process 600 continues to operation 662. The process 600 ends at operation 662, where the network device 102*a* selects the fourth clock as the SyncE clock 122. If the network device 102*a* determines that the first clock is not traceable to the fourth clock (e.g., NO), the process 600 proceeds to operation 632. At operation 632, the network device 102*a* maintains the second clock as the SyncE clock 122.

FIG. 7 shows an example of a timing circuitry 702 configured to update a counter 704, in accordance to one or more embodiments. The timing circuitry 702 comprises a SyncE monitor 706 configured to monitor SyncE clocks and a PTP monitor 708 configured to monitor PTP timestamps. The SyncE monitor 706 may be communicatively coupled to the PTP monitor 708 and configured to share SyncE frequency via signaling 710. The timing circuitry 702 may receive a SyncE1 frequency via signaling 712 and a SyncE2 frequency via signaling 714. The SyncE monitor 706 may select the signaling 712 out of multiple signaling for frequency synchronization. Further, the timing circuitry 702 may receive PTP timestamps from one or more clock sources 156 via signaling 716. The PTP monitor 708 may provide a PTP clock via signaling 718 as feedback to the timing circuitry 502. The timing circuitry 702 may calculate a PTP frequency based on the signaling 712-718. The timing circuitry may provide the PTP clock to the counter 704 via the signaling 720.

In one or more embodiments, the network device 102*a* may be configured to evaluate clocks outside of a locked state. In some embodiments, the network device 102*a* may be unable to lock to a PTP source clock. In this regard, the network device 102*a* may be configured to execute the one or more clock analysis operations 152 to evaluate traceability of any two clocks. In one embodiment, the drift in PTP time measured by the PTP servo-algorithm may be used to calculate the PTP frequency offset between an on-chip PTP DPLL and that of a PTP source. For example, the PTP clock offset may be calculated by averaging the drift calculated among successive PTP timestamps over a number of past measurements. The frequency offset of the available SyncE clocks (e.g., including the selected clock) is measured relative to the same PTP DPLL. The difference between each SyncE source frequency (e.g., SyncE1 frequency received via the signaling 712 and SyncE2 frequency received via the signaling 714) and the PTP frequency may be used to identify rogue SyncE clocks and the best SyncE clock available for synchronization. The network device 102*a* may be configured to regularly make corrections to the PTP clock frequency and phase. The analysis of PTP drift measurements across the collected results should account for any intermediate PTP servo adjustments. The above measurements may be used either to flag possible rogue clocks to an operator (e.g., via an alarm or a report), or to automatically switch to available clocks comprising a higher clock quality 146. The PLLs may be free-running during the analysis. The PLLs may be placed in electrical mode during the analysis. Herein, the drift and/or the clock offsets may be calculated in accordance with Equations (1)-(7), as described above.

In one or more embodiments, the network device 102*a* comprises the timing circuitry 702. The timing circuitry 702 may be configured to determine a SyncE frequency in signaling 710 between the SyncE monitor 706 and the PTP monitor 708 based on the SyncE1 frequency provided via the signaling 712 and the SyncE2 frequency provided via the signaling 714. In turn, the PTP frequency may be provided to the counter 704 via the signaling 720. The counter 704 may allow for maintenance of the PTP clock 120.

In some embodiments, a PTP frequency of the PTP clock 120 may be provided as a feedback in the signaling 718. The PTP frequency via the signaling 718 may be compared to a SyncE2 frequency via the signaling 714. Herein, the timing circuitry may compare the PTP clock 120 with all available SyncE sources using the FFO.

Herein, the error 730 indicates that the operational flow 700 cannot lock the network device 102*a* to a PTP clock source therefore causing a drift. In the example of FIG. 7, the error 730 indicates that the network device 102*a* is not able to lock to the PTP timestamps via signaling 716.

FIG. 8 shows an example flowchart of a process 800 to dynamically monitor clock offsets in a locked state, in accordance with one or more embodiments. Modifications, additions, or omissions may be made to the process 800. The process 800 may include more, fewer, or other operations than those shown below. For example, operations may be performed in parallel or in any suitable order. While at times discussed as the network devices 102 or the reference nodes 104, the processor 114, the clock selection controller 118, or components of any of thereof, any suitable system or components of the system 100 may perform one or more operations of the process 800. For example, one or more operations of the process 800 may be implemented, at least in part, in the form of software instructions 132 of FIG. 1, stored on a non-transitory computer readable medium, tangible, machine-readable media (e.g., memory 130 of FIG. 1) that when run by one or more processors (e.g., one or more processors 114 of FIG. 1) may cause the one or more processors to perform the operations 802-850.

In one or more embodiments, the processor 800 may be configured to analyze clock offsets when clocks are unable to lock. For example, the network device 102*a* may be configured to measure drift in clocks and select PTP clocks 120 comprising lesser amounts of drift over a period of time. In this regard, the network device 102*a* may be configured to determine whether any determined drift is within an operational range and/or an allowed range (e.g., a threshold 148). In some embodiments, the processor 800 may be directed to identifying root causes associated with failing to lock a PTP clock. Herein, the process 800 covers a shallow analysis and an in-depth analysis to determine the root causes. The shallow analysis may include measuring a drift in PTP time by a PTP servo-algorithm to calculate a PTP frequency offset between the on-chip PTP DPLL and the PTP source. Then, the frequency offset of available SyncE clocks (including a selected SyncE clock) relative to the same PTP DPLL, when compared to the PTP frequency offset may be used to identify any rogue SyncE clocks and a best SyncE clock available for synchronization. The in-depth analysis includes determining a PTP Time Error measured for the system against all available PTP masters and a SyncE time error information available from the FFO measurement during a maintenance window, and using the PTP Time Error and the SyncE time error to identify matching PTP and SyncE resources.

Herein, referencing the process 800 as a non-limiting example, the network device 102*a* is configured to analyze clock offsets when clocks are unable to lock. The process 800 starts at operation 802, where the network device 102*a* receives a first clock as the PTP clock 120 and a second clock as the SyncE clock 122 from the network device 102*b*. Herein, the network device 102*a* may be configured to receive clocks from more devices 102 than those shown and/or discussed in FIGS. 1-7. At operation 804, the network device 102*a* is configured to receive one or more SyncE clocks from one or more additional network devices 102. At operation 806, the network device 102*a* determines that the first clock cannot be locked on. At operation 808, the network device 102*a* measures drift in the first clock based on multiple first clock timestamps. At operation 810, the network device 102*a* compares the drift of the first clock with a fractional frequency offset of each SyncE clock. At operation 812, the network device 102*a* determines a list of relative clock errors based on the comparisons of operation 810. At operation 814, the network device 102*a* retrieves a clock error from the list.

The process 800 continues at operation 820, where the network device 102*a* determines whether the clock error is larger than a threshold 148 value. If the network device 102*a* determines that the clock error is larger than the threshold 148 value (e.g., YES), the process 800 continues to operation 832. If the network device 102*a* determines that the clock error is not larger than the threshold 148 value (e.g., NO), the process 800 proceeds to operation 842.

At operation 832, the network device 102*a* reports that a source of the clock error and a compared SyncE clock are untraceable to one another. At operation 842, the network device 102*a* reports that a source of the clock error and a compared SyncE clock are traceable to one another.

The process 800 may continue at operation 850, where the network device 102*a* determines whether there are any clock errors left on the list. In some embodiments, the network device may proceed to operation 814 is there are any clock errors left on the list (e.g., YES). Further, the process 800 may end if the network device 102*a* determines that there are not any clock errors left in the list (e.g., NO).

FIG. 9 shows an example flowchart of a process 900 to analyze clock offsets when clocks are unable to lock, in accordance with one or more embodiments. Modifications, additions, or omissions may be made to the process 900. The process 900 may include more, fewer, or other operations than those shown below. For example, operations may be performed in parallel or in any suitable order. While at times discussed as the network devices 102 or the reference nodes 104, the processor 114, the clock selection controller 118, or components of any of thereof, any suitable system or components of the system 100 may perform one or more operations of the process 900. For example, one or more operations of the process 900 may be implemented, at least in part, in the form of software instructions 132 of FIG. 1, stored on a non-transitory computer readable medium, tangible, machine-readable media (e.g., memory 130 of FIG. 1) that when run by one or more processors (e.g., one or more processors 114 of FIG. 1) may cause the one or more processors to perform the operations 902-942.

In one or more embodiments, the process 900 may be configured to determine sets of untraceable clock domains associated with the network 106. For example, the network device 102*a* may be configured to detect frequency offsets from one or more PTP sources in a network by establishing one or more communication sessions with additional available PTP sources. In this regard, the network device 102*a* may be configured to establish a PTP Delay Request-Response Messaging (DDRM) session and derive PTP clock frequency offsets for each PTP source with respect to the PTP clock 120 in the network device 102*a*. The process 900 may be directed to identifying untraceable clock domains in the entire network 106. Herein, the process 900 comprises the network device 102*a* locked to a SyncE and a PTP source that is configured to detect the frequency offset from other PTP sources by establishing PTP DRRM sessions with those PTP sources. With the help of these features, the network device 102*a* may derive the PTP clock frequency offset of each PTP source with respect to a corresponding clock for the network device 102*a*. Using the process 900, clock offsets of all the available PTP and SyncE sources in communication with the network 106 may be calculated and compared together.

In one or more embodiments, the network device 102*a* may be configured to detect the frequency offset from other PTP sources by establishing PTP DRRM session with other available PTP sources when a given network device 102 is locked to a SyncE and a PTP source. In some embodiments, the network device 102*a* may be configured to derive the PTP clock frequency offset of each PTP source with respect to the PTP clock 120 and/or the SyncE clock 122 in the network device 102*e*.

Herein, the network device 102*a* is configured to determine sets of untraceable clock domains in the communication network. The process 900 starts at operation 902, where the network device 102*a* receives a first clock and a second clock from the network device 102*b*. At operation 904, the network device 102*a* receives a third clock and a fourth clock from the network device 102*c*. At operation 906, the network device 102*a* selects the first clock as the PTP clock 120. At operation 908, the network device 102*a* selects the second clock as the SyncE clock 122. At operation 910, the network device 102*a* establishes a PTP DRRM session with the network device 102*c*.

The process 900 continues at operation 920, where the network device 102*a* determines whether the third clock is offset with respect to the PTP clock 120. At operation 922, the network device 102*a* calculates a drift associated with the third clock. At operation 924, the network device 102*a* averages the drift over multiple successive PTP timestamps.

The process 900 continues at operation 930, where the network device 102*a* determines whether the average drift is higher than a threshold 148. If the network device 102*a* determines that the average drift is higher than the threshold 148 (e.g., YES), the process 900 continues to operation 932. The process 900 ends at operation 932, where the network device 102*a* determines that the second network device comprises a PTP clock frequency offset. If the network device 102*a* determines that the average drift is not higher than a threshold 148 (e.g., NO), the process 900 proceeds to operation 942. The process 900 ends at operation 942, where the network device 102*a* determines that the second network device does not comprise a PTP clock frequency offset.

FIG. 10 shows an example flowchart of a process 1000 to determine sets of untraceable clock domains in the communication network, in accordance with one or more embodiments. Modifications, additions, or omissions may be made to the process 1000. The process 1000 may include more, fewer, or other operations than those shown below. For example, operations may be performed in parallel or in any suitable order. While at times discussed as the network devices 102 or the reference nodes 104, the processor 114, the clock selection controller 118, or components of any of thereof, any suitable system or components of the system 100 may perform one or more operations of the process 1000. For example, one or more operations of the process 1000 may be implemented, at least in part, in the form of software instructions 132 of FIG. 1, stored on a non-transitory computer readable medium, tangible, machine-readable media (e.g., memory 130 of FIG. 1) that when run by one or more processors (e.g., one or more processors 114 of FIG. 1) may cause the one or more processors to perform the operations 1002-1040.

The process 1000 may be configured to perform clock quality measurements and monitoring operations in one or more communication networks. For example, the network device 102*a* may be configured to optimize clock selection in a network by evaluating clock traceability, clock errors 144, and/or clock offsets in a specific communication network. In this regard, the process 1000 may be configured to implement multiple error detection processes in an iterative manner to dynamically and/or periodically measure and monitor clocks in the communication network. The communication network may be a fifth generation (5G) network, or a New Radio (NR) network as defined by the 3GPP standard. The process 1000 is directed to implementing one or more of the aforementioned processes 300 and 600-900 sequentially. The process 1000 is configured to implement the aforementioned error/offset detection operations and generating corresponding temporary or permanent solutions as necessitated by the system 100 to correct the clock errors 144. The process 1000 may be performed constantly or within a time interval and/or a time duration.

Herein, the network device 102*a* is configured to perform clock quality measurements and monitoring operations in one or more communication networks. The process 1000 starts at operation 1002, where the network device 102*a* receives a first clock and a second clock from the network device 102*b*. At operation 1004, the network device 102*a* obtains multiple thresholds 148 associated with the network device 102*a*. At operation 1006, the network device 102*a* obtain multiple error detection configuration commands 140 associated with the network device 102*a*. At operation 1008, the network device 102*a* selects at least one of the multiple error detection configuration commands 140. At operation 1010, the network device 102*a* selects at least one of the multiple thresholds 148. The thresholds 148 may be configured to be in a decreasing order, an increasing order, and/or selected at random values on each iteration of the process 10. In some embodiments, the thresholds are dynamically and/or periodically modified and/or updated. At operation 1012, the network device 102*a* evaluates the first clock based on the thresholds 148 and the error detection configuration commands 140.

The process 1000 continues at operation 1020, where the network device 102*a* determines whether at least one clock error 144 is detected. If the network device 102*a* determines that at least one clock error 144 is detected (e.g., YES), the process 1000 continues to operation 1022. If the network device 102*a* determines that at least one clock error 144 is not detected (e.g., NO), the process 1000 proceeds to operation 1040.

At operation 1022, the network device 102*a* records the threshold 148 and the error detection method against an input reference. The process 1000 continues at operation 1030, where the network device 102*a* determines whether there are additional error detection methods available. If the network device 102*a* determines that there are additional error detection methods available (e.g., YES), the process 1000 continues to operation 1008. If the network device 102*a* determines that there are no additional error detection methods available (e.g., NO), the process 1000 ends.

The process 1000 may continue at operation 1040, where the network device 102*a* determines whether there are additional thresholds 148 to evaluate. If the network device 102*a* determines that there are additional thresholds 148 to evaluate (e.g., YES), the process 1000 returns to operation 1010. Upon returning to operation 1010, the process 1000 selects an additional value for the threshold 148. If the network device 102*a* determines that there are no additional thresholds 148 to evaluate (e.g., NO), the process 1000 continues to operation 1030.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate operations, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. An apparatus, comprising:

a memory configured to store:

a plurality of clock source selection operations configured to facilitate selection of one or more clock sources; and a plurality of clock monitoring operations configured to monitor the plurality of clock source selection operations; and a processor communicatively coupled to the memory and configured to:

receive a first clock and a second clock from a first network device;

obtain a plurality of thresholds associated with the first network device;

obtain a plurality of error detection configuration commands, each error detection configuration command of the plurality of error detection configuration commands is configured to evaluate clock errors in the first clock;

in accordance with the plurality of clock monitoring operations, select a first threshold of the plurality of thresholds;

in accordance with the plurality of clock monitoring operations, select a first error detection configuration command of the plurality of error detection configuration commands;

evaluate the first clock based at least in part upon the first threshold and the first error detection configuration command;

generate a first result indicating whether the first clock comprises a first clock error greater than the first threshold; and in response to generating the first result indicating that the first clock comprises the first clock error greater than the first threshold, record the first threshold and the first error detection configuration command against a first input reference of the first clock.

2. The apparatus of claim 1, wherein the processor is further configured to:

in accordance with the plurality of clock monitoring operations, select a second threshold of the plurality of thresholds;

in accordance with the plurality of clock monitoring operations, select a second error detection configuration command of the plurality of error detection configuration commands;

evaluate the second clock based at least in part upon the second threshold and the second error detection configuration command; and generate a second result indicating whether the second clock comprises a second clock error greater than the second threshold.

3. The apparatus of claim 2, wherein the processor is further configured to:

in response to generating the second result indicating that the second clock comprises the second clock error greater than the second threshold, record the second threshold and the second error detection configuration command against a second input reference of the first clock;

select a third threshold of the plurality of thresholds;

in accordance with the plurality of clock monitoring operations, select the second error detection configuration command of the plurality of error detection configuration commands;

evaluate the first clock based at least in part upon the third threshold and the second error detection configuration command; and generate a third result indicating whether the first clock comprises a third clock error greater than the third threshold.

4. The apparatus of claim 3, wherein the second threshold is lower than the third threshold.

5. The apparatus of claim 1, wherein the plurality of clock monitoring operations are at least partially performed in accordance with one or more configuration commands associated with a Precise Frequency Monitor (PFM).

6. The apparatus of claim 1, wherein the plurality of clock monitoring operations are at least partially performed in accordance with one or more configuration commands associated with a Single Cycle Monitor (SCM).

7. The apparatus of claim 1, wherein the plurality of clock monitoring operations are at least partially performed in accordance with one or more configuration commands associated with a Coarse Frequency Monitor (CFM).

8. A method, comprising:

receiving a first clock and a second clock from a first network device;

obtaining a plurality of thresholds associated with the first network device;

obtaining a plurality of error detection configuration commands, each error detection configuration command of the plurality of error detection configuration commands is configured to evaluate clock errors in the first clock;

in accordance with a plurality of clock monitoring operations, selecting a first threshold of the plurality of thresholds;

in accordance with the plurality of clock monitoring operations, selecting a first error detection configuration command of the plurality of error detection configuration commands;

evaluating the first clock based at least in part upon the first threshold and the first error detection configuration command;

generating a first result indicating whether the first clock comprises a first clock error greater than the first threshold; and in response to generating the first result indicating that the first clock comprises the first clock error greater than the first threshold, recording the first threshold and the first error detection configuration command against a first input reference of the first clock.

9. The method of claim 8, further comprising:

in accordance with the plurality of clock monitoring operations, selecting a second threshold of the plurality of thresholds;

in accordance with the plurality of clock monitoring operations, selecting a second error detection configuration command of the plurality of error detection configuration commands;

evaluating the second clock based at least in part upon the second threshold and the second error detection configuration command; and generating a second result indicating whether the second clock comprises a second clock error greater than the second threshold.

10. The method of claim 9, further comprising:

in response to generating the second result indicating that the second clock comprises the second clock error greater than the second threshold, recording the second threshold and the second error detection configuration command against a second input reference of the first clock;

selecting a third threshold of the plurality of thresholds;

in accordance with the plurality of clock monitoring operations, selecting the second error detection configuration command of the plurality of error detection configuration commands;

evaluating the first clock based at least in part upon the third threshold and the second error detection configuration command; and generating a third result indicating whether the first clock comprises a third clock error greater than the third threshold.

11. The method of claim 10, wherein the second threshold is lower than the third threshold.

12. The method of claim 8, wherein the plurality of clock monitoring operations are at least partially performed in accordance with one or more configuration commands associated with a Precise Frequency Monitor (PFM).

13. The method of claim 8, wherein the plurality of clock monitoring operations are at least partially performed in accordance with one or more configuration commands associated with a Single Cycle Monitor (SCM).

14. The method of claim 8, wherein the plurality of clock monitoring operations are at least partially performed in accordance with one or more configuration commands associated with a Coarse Frequency Monitor (CFM).

15. A non-transitory computer readable medium storing instructions that when executed by a processor cause the processor to:

receive a first clock and a second clock from a first network device;

obtain a plurality of thresholds associated with the first network device;

obtain a plurality of error detection configuration commands, each error detection configuration command of the plurality of error detection configuration commands is configured to evaluate clock errors in the first clock;

in accordance with a plurality of clock monitoring operations, select a first threshold of the plurality of thresholds;

in accordance with the plurality of clock monitoring operations, select a first error detection configuration command of the plurality of error detection configuration commands;

evaluate the first clock based at least in part upon the first threshold and the first error detection configuration command;

generate a first result indicating whether the first clock comprises a first clock error greater than the first threshold; and in response to generating the first result indicating that the first clock comprises the first clock error greater than the first threshold, record the first threshold and the first error detection configuration command against a first input reference of the first clock.

16. The non-transitory computer readable medium of claim 15, wherein the processor is further caused to:

in accordance with the plurality of clock monitoring operations, select a second threshold of the plurality of thresholds;

in accordance with the plurality of clock monitoring operations, select a second error detection configuration command of the plurality of error detection configuration commands;

evaluate the second clock based at least in part upon the second threshold and the second error detection configuration command; and generate a second result indicating whether the second clock comprises a second clock error greater than the second threshold.

17. The non-transitory computer readable medium of claim 16, wherein the processor is further caused to:

in response to generating the second result indicating that the second clock comprises the second clock error greater than the second threshold, record the second threshold and the second error detection configuration command against a second input reference of the first clock;

select a third threshold of the plurality of thresholds;

in accordance with the plurality of clock monitoring operations, select the second error detection configuration command of the plurality of error detection configuration commands;

evaluate the first clock based at least in part upon the third threshold and the second error detection configuration command; and generate a third result indicating whether the first clock comprises a third clock error greater than the third threshold.

18. The non-transitory computer readable medium of claim 15, wherein the plurality of clock monitoring operations are at least partially performed in accordance with one or more configuration commands associated with a Precise Frequency Monitor (PFM).

19. The non-transitory computer readable medium of claim 15, wherein the plurality of clock monitoring operations are at least partially performed in accordance with one or more configuration commands associated with a Single Cycle Monitor (SCM).

20. The non-transitory computer readable medium of claim 15, wherein the plurality of clock monitoring operations are at least partially performed in accordance with one or more configuration commands associated with a Coarse Frequency Monitor (CFM).

* * * * *